United States Patent
Hussain et al.

(10) Patent No.: US 10,599,306 B2
(45) Date of Patent: Mar. 24, 2020

(54) ELECTRONIC DEVICE AND METHOD FOR OPERATING NOTIFICATION BAR THEREOF

(71) Applicant: Samsung Electronics Co., Ltd., Suwon-si, Gyeonggi-do (KR)

(72) Inventors: Tanvir Hussain, Dacca (BD); Muhammad Anwar Parvez, Mymensingh (BD); Muhammad Saiful Islam, Dacca (BD)

(73) Assignee: Samsung Electronics Co., Ltd., Suwon-si (KR)

( * ) Notice: Subject to any disclaimer, the term of this patent is extended or adjusted under 35 U.S.C. 154(b) by 142 days.

(21) Appl. No.: 15/061,409

(22) Filed: Mar. 4, 2016

(65) Prior Publication Data
US 2016/0266742 A1   Sep. 15, 2016

(30) Foreign Application Priority Data

Mar. 9, 2015 (KR) .......................... 10-2015-0032712

(51) Int. Cl.
*G06F 3/0482* (2013.01)
*G06F 3/0484* (2013.01)
*G06F 3/0488* (2013.01)

(52) U.S. Cl.
CPC ........ *G06F 3/04842* (2013.01); *G06F 3/0488* (2013.01); *G06F 3/0482* (2013.01)

(58) Field of Classification Search
CPC ... G06F 3/0482; G06F 3/04842; G06F 3/0488
See application file for complete search history.

(56) References Cited

U.S. PATENT DOCUMENTS

| | | | |
|---|---|---|---|
| 7,996,045 B1* | 8/2011 | Bauer | G06F 3/0488 455/566 |
| 9,154,606 B2* | 10/2015 | Tseng | H04M 1/72552 |
| 9,485,312 B2* | 11/2016 | Gniffke | H04L 67/147 |
| 9,846,530 B2* | 12/2017 | Sihn | G06F 3/0481 |
| 2009/0249247 A1* | 10/2009 | Tseng | H04M 1/72552 715/808 |
| 2009/0327940 A1* | 12/2009 | Duncan | G06F 3/048 715/765 |
| 2012/0101952 A1* | 4/2012 | Raleigh | G06Q 30/016 705/304 |
| 2012/0204191 A1* | 8/2012 | Shia | G06Q 10/10 719/318 |
| 2012/0278722 A1* | 11/2012 | Raleigh | H04L 12/14 715/735 |

(Continued)

FOREIGN PATENT DOCUMENTS

| KR | 10-1276826 B1 | 4/2008 |
|---|---|---|
| KR | 10-2010-0039977 A | 4/2010 |

*Primary Examiner* — Shen Shiau
(74) *Attorney, Agent, or Firm* — Jefferson IP Law, LLP

(57) ABSTRACT

An electronic device which can easily access information associated with an item displayed in a notification bar and a method for operating a notification bar thereof are provided. The electronic device includes a touch screen for detecting a selection of an item displayed in the notification bar, and a controller for controlling the touch screen so as to display an information providing window which provides information associated with the selected item, in response to selection of the item.

13 Claims, 21 Drawing Sheets

(56) References Cited

U.S. PATENT DOCUMENTS

| | | | | |
|---|---|---|---|---|
| 2012/0303484 | A1* | 11/2012 | Kim | G06Q 50/01 705/26.61 |
| 2013/0132854 | A1* | 5/2013 | Raleigh | G06F 3/0482 715/738 |
| 2014/0179377 | A1* | 6/2014 | Song | H04M 1/72522 455/566 |
| 2014/0320425 | A1* | 10/2014 | Jeong | G06F 3/1454 345/173 |
| 2015/0031417 | A1* | 1/2015 | Lee | H04M 1/72519 455/566 |
| 2015/0172440 | A1* | 6/2015 | Cho | H04M 1/72547 455/412.2 |
| 2015/0201058 | A1* | 7/2015 | Cho | H04M 1/72522 455/563 |
| 2015/0249733 | A1* | 9/2015 | Miura | H04M 1/72563 455/566 |
| 2016/0011726 | A1* | 1/2016 | Felt | G06F 3/0482 715/828 |
| 2016/0209986 | A1* | 7/2016 | Kim | G06F 3/0481 |
| 2017/0160884 | A1* | 6/2017 | Son | G06F 3/0482 |

\* cited by examiner

ELECTRONIC DEVICE AND METHOD FOR OPERATING NOTIFICATION BAR THEREOF

CROSS-REFERENCE TO RELATED APPLICATION(S)

This application claims the benefit under 35 U.S.C. § 119(a) of a Korean patent application filed on Mar. 9, 2015 in the Korean Intellectual Property Office and assigned Serial number 10-2015-0032712, the entire disclosure of which is hereby incorporated by reference.

TECHNICAL FIELD

The present disclosure relates to an electronic device which can easily access (i.e., acquire) various information associated with an item displayed in a notification bar and a method for operating a notification bar thereof.

BACKGROUND

Currently, with the remarkable development of information communication technology and semiconductor technology, the spread and use of electronic devices (e.g., mobile communication terminals) are rapidly increasing. Accordingly, the electronic device has become a necessity for modern people, and has provided various functions required by users. For example, the electronic device provides various functions such as calling, photographing an image or video, receiving broadcasts, connecting to the Internet, recording and the like.

In addition, the electronic device provides various important and valuable pieces of information through displays, such as a notification bar. In general, the notification bar provides various pieces of information in a form of icons. For example, the electronic device provides the remaining battery level, a signal strength, an unchecked text message, time and date, whether Bluetooth (BT) is connected, whether wireless fidelity (Wi-Fi) is connected, and so forth, in the form of icons in the notification bar.

However, the notification bar only provides brief information in an icon or a text format, but does not provide detailed information. Therefore, the electronic device of the related art has an inconvenience that the user needs to expand a notification bar in order to check the detailed information. For example, the user may be required to touch an upper end of a screen in which the notification bar is displayed and then touch-move (e.g., drag) in a lower end direction to expand the notification bar. In various embodiments, in order to check the detailed information, the user needs to activate its functions. For example, the user may be required to activate a text message function on a home screen or a menu screen in order to check detailed information on an unchecked text message (e.g., the content of the text message, the receiving time, counterpart information, and so forth).

Since the electronic device of the related art provides only brief information in the notification bar, there is an inconvenience for the user to check the detailed information.

The above information is presented as background information only, to assist with an understanding of the present disclosure. No determination has been made, and no assertion is made, as to whether any of the above might be applicable as prior art with regard to the present disclosure.

SUMMARY

Aspects of the present disclosure address at least the above-mentioned problems and/or disadvantages and provide at least the advantages described below. Accordingly, an aspect of the present disclosure is to provide an electronic device and a method for operating a notification bar thereof, which can conveniently, quickly, and easily access detailed information on an item (an icon or a numeral/text) displayed on the notification bar without expanding the notification bar.

Another aspect of the present disclosure is to provide an electronic device and a method for operating a notification bar thereof, which provides detailed information on a selected item when detecting a first selection (e.g., hovering) for an item displayed on a notification, and perform a function corresponding to a selected item when detecting a second selection (e.g., touch) for the item.

Another aspect of the present disclosure is to provide an electronic device and a method for operating a notification bar thereof, which may register an application icon (hereinafter, an app icon) on a home screen or a menu screen on a notification bar, and remove the app icon registered on the notification bar.

In accordance with an aspect of the present disclosure, an electronic device is provided. The electronic device includes a touch screen that detects a selection of an item displayed in a notification bar, and a controller for controlling the touch screen to display an information providing window which provides information associated with the selected item, in response to the selection of the item.

In accordance with an aspect of the present disclosure, a method for operating a notification bar by an electronic device is provided. The method includes detecting a selection of an item included in a notification bar, and outputting an information providing window which provides information associated with the selected item.

In accordance with another aspect of the present disclosure, a computer-readable recording medium is provided. The computer-readable medium includes a program executed in a computer, the program including detecting a selection of an item included in a notification bar, and outputting an information providing window which provides information associated with the selected item.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

Figure 1:
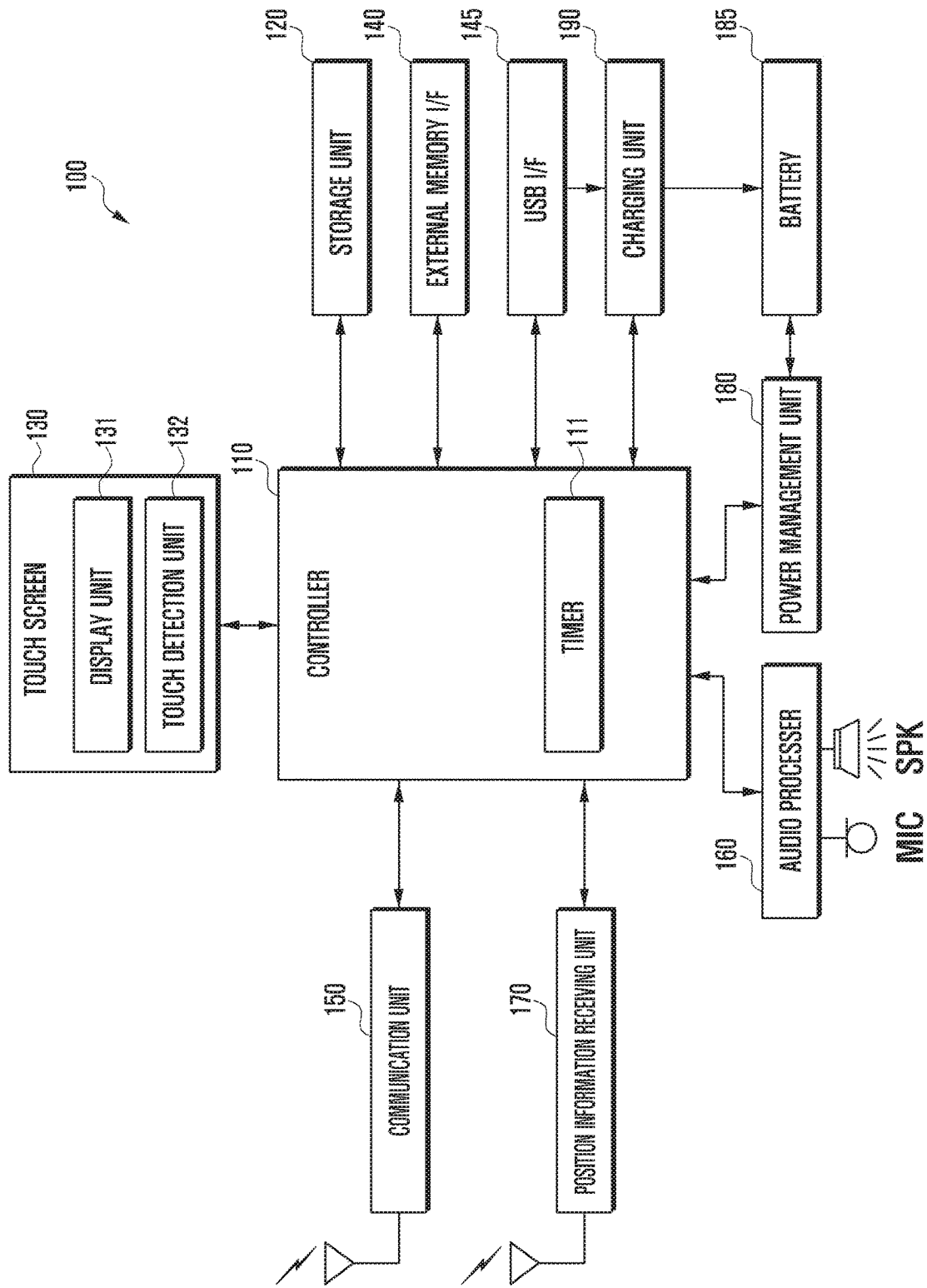
FIG. 1 is block diagram illustrating a configuration of an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the spirit and scope of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a", "an", and "the", include plural referents unless the context clearly dictates otherwise. Thus, for example, reference to "a component surface" includes reference to one or more of such surfaces.

In the description of the drawings, identical or similar reference numerals are used to designate identical or similar elements.

As used in various embodiments of the present disclosure, the expressions "include", "may include" and other conjugates refer to the existence of a corresponding disclosed function, operation, or constituent element, and do not limit one or more additional functions, operations, or constituent elements.

Further, as used in various embodiments of the present disclosure, the terms "include", "have", and their conjugates are intended merely to denote a certain feature, numeral, operation, element, component, or a combination thereof, and should not be construed to exclude the existence of or a possibility of the addition of one or more other features, numerals, operations, elements, components, or combinations thereof.

The term "or" used in various embodiments of the present disclosure includes any or all of combinations of listed words. For example, the expression "A or B" may include A, may include B, or may include both A and B.

The expressions such as "first", "second", and the like, used in various embodiments of the present disclosure may modify various component elements in the various embodiments, but may not limit corresponding component elements. For example, the above expressions do not limit the sequence and/or importance of the elements. The above expressions are used merely for the purpose of distinguishing an element from the other elements. For example, a first user device and a second user device indicate different user devices although both of them are user devices. For example, a first element may be termed a second element, and likewise a second element may also be termed a first element without departing from the scope of various embodiments of the present disclosure.

In the case where an element is referred to as being "connected" or "accessed" to other elements, it should be understood that not only the element is directly connected or accessed to the other elements, but also another element may exist between them. Contrarily, when an element is referred to as being "directly coupled" or "directly connected" to any other element, it should be understood that no element is interposed therebetween.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of the art, and are not to be interpreted to have ideal or excessively formal meanings unless clearly defined in the present disclosure.

For example, the electronic device may include at least one of a smartphone, a tablet personal computer (PC), a mobile phone, a video phone, an electronic book (e-book) reader, a desktop PC, a laptop PC, a netbook computer, a personal digital assistant (PDA), a portable multimedia player (PMP), a Moving Picture Experts Group phase 1 or phase 2 (MPEG-1 or MPEG-2) audio layer 3 (MP3) player, a mobile medical appliance, a camera, and a wearable device (e.g., a head-mounted-device (HMD) such as electronic glasses, electronic clothes, an electronic bracelet, an electronic necklace, an electronic appcessory, electronic tattoos, or a smartwatch).

According to various embodiments, the electronic device may be a smart home appliance. For example, the smart home appliance may include at least one of a television, a digital video disc (DVD) player, an audio player, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an electronic dictionary, an electronic key, a camcorder, and an electronic photo frame.

According to various embodiments, the electronic device may include at least one of various medical appliances (e.g., magnetic resonance angiography (MRA), magnetic resonance imaging (MRI), computed tomography (CT), and ultrasonic machines), navigation equipment, a global positioning system (GPS) receiver, an event data recorder (EDR), a flight data recorder (FDR), automotive infotainment device, electronic equipment for ships (e.g., ship navigation equipment and a gyrocompass), avionics, security equipment, a vehicle head unit, an industrial or home robot, an automatic teller machine (ATM) of a banking system, and a point of sales (POS) of a shop.

According to various embodiments, the electronic device may include at least one of a part of furniture or a building/structure, an electronic board, an electronic signature receiving device, a projector, and various kinds of measuring instruments (e.g., a water meter, an electric meter, a gas meter, and a radio wave meter).

The electronic device according to various embodiments of the present disclosure may be a combination of one or more of the aforementioned various devices. Further, the electronic device according to various embodiments of the present disclosure may be a flexible device. Further, it will be apparent to those skilled in the art that the electronic device according to various embodiments of the present disclosure is not limited to the aforementioned devices.

Hereinafter, an electronic device according to various embodiments of the present disclosure will be described with reference to the accompanying drawings. The term "user" as used in various embodiments of the present disclosure may refer to a person who uses an electronic device or a device (e.g., artificial intelligence electronic device) that uses an electronic device.

FIG. 1 is a block diagram illustrating a configuration of an electronic device according to an embodiment of the present disclosure.

Referring to FIG. 1, an electronic device 100 according to an embodiment of the present disclosure may include a controller 110, a storage unit 120, a touch screen 130, an external memory interface (I/F) 140, a universal serial bus (USB) I/F 145, a communication unit 150, an audio processer 160, a position information receiving unit 170, a power management unit 180, a battery 185, and a charging unit 190.

The controller 110 may control overall operations of the electronic device 100 and a signal flow between internal blocks of the electronic device 100, and may perform a data processing function for processing data. For example, the controller 110 may be configured with a central processing unit (CPU), an application processor, and the like. The controller 110 may be formed of a single core processor or a multi-core processor. In addition, the controller 110 may include multiple processors.

The controller 110, according to an embodiment of the present disclosure, may control a procedure for operating a notification bar. For example, when detecting the selection of an item registered in the notification bar, the controller 110 may provide an information providing window which provides detailed information on the selected item. The controller 110 may remove the information providing window when a predetermined time (e.g., 3 sec) has elapsed or a removal command is input. To this end, the controller 110 may include a timer 111 for measuring elapsed time. Referring to FIGS. 2 to 17, a procedure for operating a notification bar will be described in greater detail.

The controller 110 may control a procedure for registering an app icon located in a home screen or a menu screen in the notification bar, or a procedure for removing the app icon from the notification bar. For example, when the app icon located in the home screen or the menu screen is moved to the notification bar area, the controller 110 may register the app icon as moved to the notification bar. In addition, when the app icon located in the notification bar is moved to the home screen or the menu screen, the controller 110 may remove the app icon from the notification bar. Referring to FIGS. 18 to 21, procedures for registering and removing such app icons will be described in greater detail.

The storage unit 120 may store an operating system (OS) of the electronic device 100 and application programs necessary for other optional functions, such as a sound reproduction function, an image or video reproduction function, a broadcast reproduction function, an Internet access function, a text message function, a game function, a map service function, and the like. In addition, the storage unit 120 may store various data, for example, music data, video data, game data, movie data, map data, and so forth.

The storage unit 120 according to an embodiment of the present disclosure may store various information required to provide detailed information on the item selected in the notification bar. For example, the storage unit 120 may store alarm information, battery information, call history, Bluetooth (BT) configuration information (e.g., paired device information), wireless fidelity (Wi-Fi) configuration information (previously connected access point (AP) information), text message information, and so forth.

The touch screen 130 may perform an input function and a display function. To do so, the touch screen 130 may include a display unit 131 and a touch detection unit 132.

The display unit 131 displays information input by a user or information to be provided to the user, as well as various menus of the electronic device 100. The display unit 131 may be formed of a liquid crystal display, an organic light emitting diode (OLED), an active matrix OLED (AMOLED), a flexible display (Flexible Display), a transparent display, and so forth. The display unit 131 may provide various screens according to the use of the electronic device 100, for example, a home screen, a menu screen, a locked screen, a game screen, a webpage screen, a call screen, and so forth. The display unit 131 according to an embodiment of the present disclosure may display various screens, for example, screens illustrated in FIGS. 3 to 17, 19A, 19B, and 21, for operating a notification bar and registering/removing an app icon.

The touch detection unit 132 is a device for providing an input function, and may generate a touch event and transmit the generated touch event to the controller 110 when a touch input means, such as a user's finger, a stylus, a touch pen, and the like, contacts or approaches the touch detection unit 132 (or a protection window covering the touchscreen). The touch detection unit 132 may recognize the occurrence of a touch event based on a change in a physical quantity (e.g., capacitance, resistance, and the like) according to a contact or approach by the touch input means. Further, the touch detection unit 132 may further include a touch panel of an electromagnetic induction method for recognizing an electronic pen of an electromagnetic induction method. Since the touch detection unit 132 as described above is known to those skilled in the art, a detailed description thereof will be omitted for clarity.

The external memory I/F 140 may support communication with an external memory. The external memory I/F 140 may include an interface such as a secure digital (SD) card and a micro SD card standard. According to one embodiment of the present disclosure, when an external memory is mounted on the external memory I/F 140, the controller 110 may display a memory icon in the notification bar in order to notify of the mounting of the external memory to the user.

The USB I/F 145 may support the connection of the external device (e.g., PC, on the go (OTG) device, USB memory) that support a USB interface standard. The USB I/F 145 may be a micro USB or a mini-USB. The USB I/F 145 may support a USB 2.0 or a 3.0 standard, but embodiments are not limited thereto. According to an embodiment of the present disclosure, when an external device is connected to the USB I/F 145, the controller 110 may display a USB icon in the notification bar in order to notify of the connection with the external device to the user.

The communication unit 150 may support a wired and/or wireless communication function of the electronic device 100. For example, the communication unit 150 may include a mobile communication module for supporting mobile communication (e.g., 2G, 3G, 4G, and/or 5G mobile communication standards) functions, a wireless local access network (LAN) communication module for supporting the short-range wireless communication function, a Wi-Fi communication module, a BT communication module, an infrared communication module, a ZigBee communication module, high definition multimedia interface (HDMI) communication module for supporting a wired communication function, and so forth.

According to an embodiment of the present disclosure, the communication unit 150 may receive a variety of events. For example, the communication unit 150 may receive a text message, a call request, and an e-mail. When the communication unit 150 receives the text message, the e-mail, and the like, the controller 110 may display a text message icon, an e-mail icon, and the like, in the notification bar. In addition, when the Wi-Fi communication module and the Bluetooth communication module are turned on, the controller 110 may display the Wi-Fi icon and the Bluetooth icon in the notification bar.

The audio processor 160 may be connected with a speaker (SPK) for outputting an audio signal transmitted/received during a call, an audio signal included in a received message, or an audio signal according to a reproduction of an audio file stored in the storage unit 120, and at least one microphone (MIC) for collecting a voice of the user or other audio signals. For example, the audio processer 160 may output audio signals according to music file playback, video file playback, game playback, and so forth through the speaker SPK. In addition, the audio processer 160 may output an audio signal for audibly notifying the occurrence of an event through the speaker SPK.

The position information receiving unit 170 may receive position information of the electronic device 100. The position information receiving unit 170 may include a GPS, a global navigation satellite system (GNSS), and the like. When a map application is activated and turned on, the position information receiving unit 170 may provide a current position of the electronic device 100 to the map application.

The power management unit 180 may manage power of the electronic device 100. The power management unit 180 may be a power management integrated circuit (PMIC). The PMIC may receive power from a battery 185 or an external power source (e.g., a battery charger) and supply power to internal configurations of the electronic device 100, for example, the controller 110, the storage unit 120, the touch screen 130, the external memory I/F 140, the USB I/F 145, the communication unit 150, the audio processer 160, the position information receiving unit 170, the charging unit 190, and so forth.

The battery 185 may store or generate electricity (energy), and may supply power to the electronic device 100 using the stored or generated electricity. The battery 185 may include a rechargeable battery or a solar battery.

The charging unit 190 may charge the battery 185 utilizing the external power source. The charging unit 190 may support wired and wireless charging. For example, the charging unit 190 may support wireless charging such as a magnetic resonance method, a magnetic induction method, an acoustic method, and/or an electromagnetic wave method, and may include additional circuitry for wireless charging, for example, a coil loop, a resonant circuit, or a rectifier. In addition, the charging unit 190 may be connected to a travel adaptor via the USB I/F 140 to charge the battery 185.

Although not shown in FIG. 1, the electronic device 100 may further selectively include component elements of a broadcast receiving module for receiving broadcast contents, a digital sound source playback module such as MP3 module, and various sensor modules such as an infrared sensor module and an illuminance sensor module. Alternatively, the electronic device 100 according to an embodiment of the present disclosure may further include component elements of an equivalent level to the above described component elements.

Figure 2:
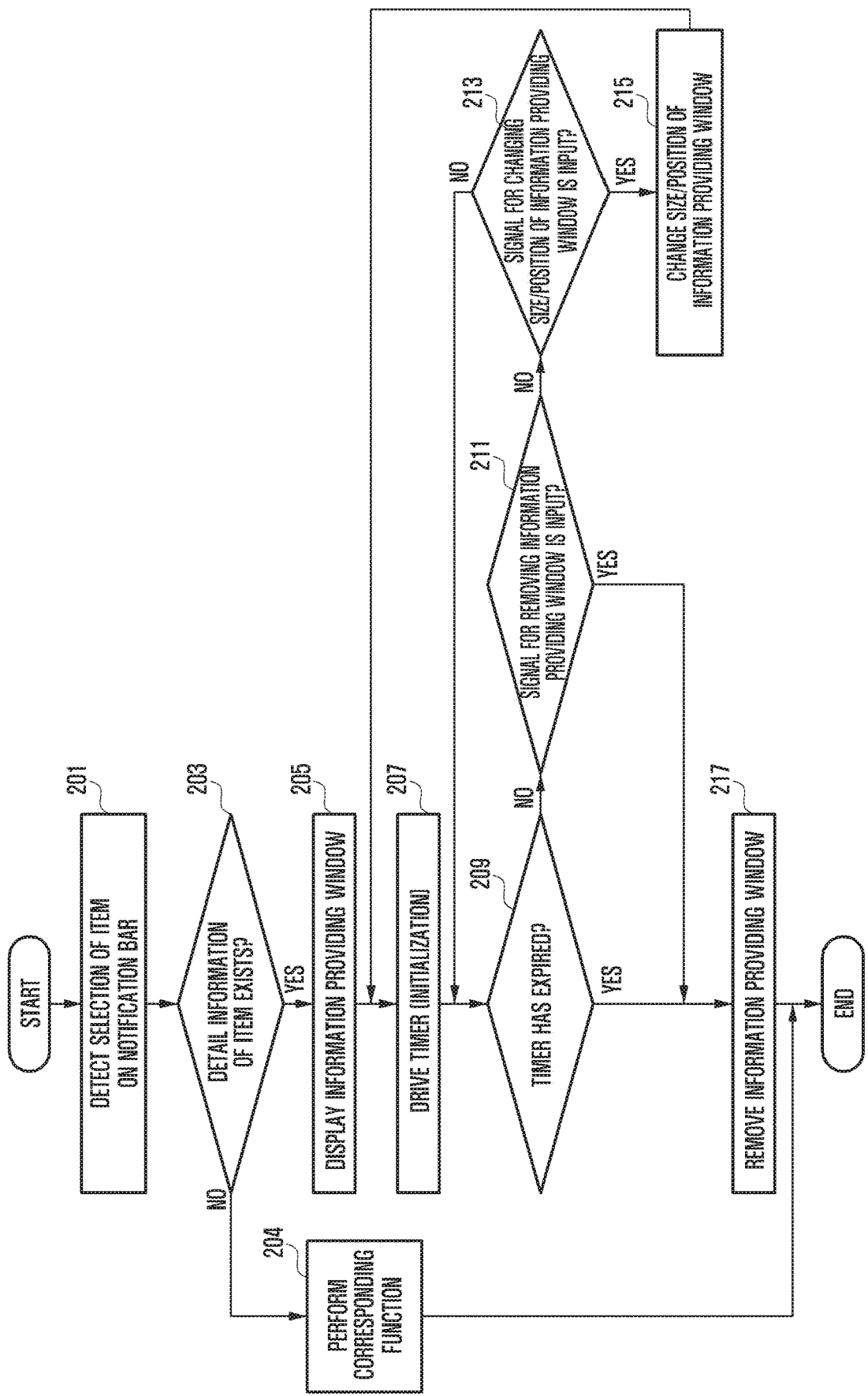
FIG. 2 is a flowchart illustrating a method for operating a notification bar by an electronic device according to an embodiment of the present disclosure.

FIG. 2 is a flowchart illustrating method for operating a notification bar by an electronic device according to an embodiment of the present disclosure.

Referring to FIG. 2, the controller 110 of the electronic device 100 according to an embodiment of the present disclosure may detect the selection of items (e.g., an icon, a text, a numeral, and so forth) in the notification bar, in operation 201. The selection may include hovering of a touch input tools (e.g., a finger, a stylus, an electronic pen, and so forth), or touch events (e.g., tap, double touch, multi-touch, drag, long touch, and so forth).

In operation 203, the controller 110 may check whether the detailed information of the selected item is present (or exists). When it is identified that there is no detailed information in operation 203, the controller 110 may perform a function corresponding thereto, in operation 204. For example, the controller 110 may execute an application corresponding to the selected item. Further, the controller 110 may display a pop-up window indicating that there is no more information to be provided. Furthermore, the controller 110 may ignore the selection without performing any special operation.

In various embodiments, when it is identified that the detailed information exists in operation 203, the controller 110 proceeds to operation 205 and may control the display unit 131 so as to output an information providing window which provides detailed information associated with the selected item. The information providing window may be provided in an overlay scheme, but embodiments are not limited thereto. In various embodiments, the information providing window may be provided in non-transparent or semi-transparent form.

The controller 110 may drive the timer 111 in operation 207. The timer 111 may measure a predetermined time (e.g., three seconds) to thereafter automatically remove the information providing window. The predetermined time may be changed by the user.

The controller 110 may check whether the timer 111 expires in operation 209. When the timer 111 has not expired, the controller 110 may proceed to operation 211 and check whether a signal for removing the information providing window is input. The removal signal of the information providing window may be input through a predetermined key (e.g., a cancel key) or a removal menu (as illustrated by 1311 in FIG. 13 described in greater detail below) located on one side of the information providing window.

When the removal signal of the information providing window is not input in operation 211, the controller 110 proceeds to operation 213 and may check whether a signal for changing the size and/or position (hereinafter, referred to as the size/position) of the information providing window is input. The size of the information providing window may be changed according to the input of an expansion/reduction menu (as shown by 1313 and 1315 in FIG. 13 described in greater detail below) located at one side of the information providing window. In various embodiments, the size of the information providing window may also be changed in response to a user input for touching and dragging each side or a corner of the information providing window. The position of the information providing window may be changed in response to a user input for touching and dragging one side of the information providing window.

In operation 213, when the size/position change signal of the information providing window is not input, the controller 110 may return to operation 209. When the size/position change signal of the information providing window is input in operation 213, the controller 110 may proceed to operation 215, change the size/position of the information providing window, and return to operation 207. As described above, when the size/position of the information providing window is changed, the timer 111 may be initialized.

When the timer 111 expires in operation 209, or the removal signal of the information providing window is input in operation 211, the controller 110 may proceed to operation 217 and remove the information providing window.

According to various embodiments, when all the objects which can be registered in the notification bar have detailed information, operation 203 may be omitted. For example, when detecting the selection of items on the notification bar, the controller 110 may control the display unit 131 to display the information providing window which provides detailed information associated with the selected item.

According to various embodiments, different operations may be performed depending on the type of the selection of items in the notification bar. For example, the controller 110 may output, when detecting a first selection (e.g., hovering) for an item in a notification bar, the information providing window, and perform, when detecting a second selection (e.g., touch) for the item in the notification bar, a function corresponding to the selected second item and turn on/off a function of the selected second item. The first selection and the second selection may be set variously in accordance with a designer's or user's intention. For example, the first selection may be set as a "touch", and the second selection may be set as a "long touch", but embodiments are not limited thereto. For example, the first selection may be set as a "long touch", and the second selection may be set as a "touch".

FIGS. 3 to 17 are diagrams of screens for illustrating methods for operating a notification bar by an electronic device according to various embodiments of the present disclosure.

For the convenience of the following explanations, an example of tapping an item in a notification bar area using a stylus will first be described. However, as described above, embodiments of the present disclosure may utilize a variety of touch input tools (e.g., a finger, an electronic pen, and so forth). In addition, embodiments of the present disclosure may utilize various touch events (e.g., hovering of the touch input tools, double touch, long touch, multi-touch, drag, and so forth). In addition, the touch event may be touch events (e.g., tap, double touch, long touch, hovering, and so forth) that occur in a state of pressing a specific button included in the electronic pen.

Figure 3:
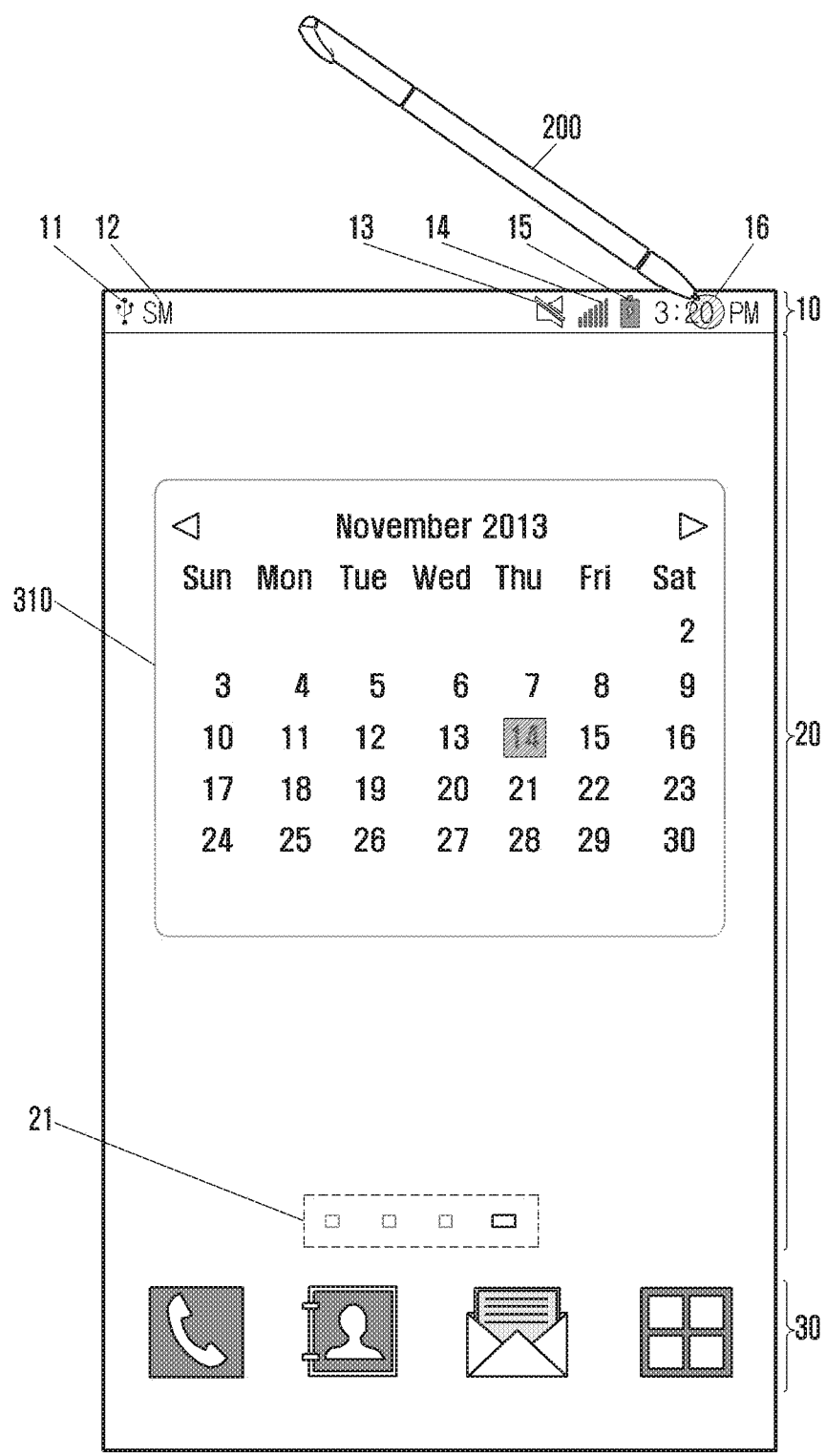
FIGS. 3 to 17 are diagrams of screens for illustrating methods for operating a notification bar by an electronic device according to various embodiments of the present disclosure.

Referring to FIG. 3, a touch screen of an electronic device is illustrated according to an embodiment of the present disclosure, and may display a home screen. The home screen may include a notification bar area 10, an item area 20, and a docking bar area 30.

A shortcut icon, an application icon, a widget icon, and so forth, may be displayed in the item area 20. The item area 20 may be configured by multiple pages, and an icon 21 can be provided highlighting the present page of the total pages of the item area. For example, referring to icon 21 of FIG. 3, it can be visually determined by the user that page four from among a total of four pages is being displayed in the item area 20.

The docking bar area 30 may include frequently used apps or function icons. The docking bar area 30 may be a fixed area different from the item area 20. For example, even when the page of the item area 20 is moved, the docking bar area 30 is not moved.

The notification bar area 10 is an area on which a notification bar is displayed, and the notification bar may display various pieces of information in a form of items (e.g., an icon, a numeral or a text, and so forth). For example, as shown in FIG. 3, the notification bar may include a USB icon 11 notifying of whether a USB device is connected, a subscriber identification modulation (SIM) icon 12 notifying of whether a user identification card (e.g., SIM) is mounted, a mode icon 13 notifying of a vibration/sound mode, a signal strength icon 14 notifying of a strength of the received signal, a battery icon 15 notifying of a remaining battery capacity and whether battery charging is performed or not, and time icon 16 notifying of a current time. This is only an example, and the notification bar may include any number or arrangement of icons, such as a missed call icon notifying of a missed call, a text message icon notifying the presence of an unchecked text message, a BT icon notifying of an on/off state of a BT function and whether BT is connected, a Wi-Fi icon notifying of an on/off state of a Wi-Fi function and whether Wi-Fi is connected, an alarm icon notifying of whether an alarm is set, a media control icon notifying that multimedia is being played, and a data icon notifying that data is being transmitted/received.

The controller 110 may display or remove at least some of the various items described above in or from the notification bar, in response to an event occurrence. For example, the controller 110 may display the text message icon in the notification bar when receiving a new text message, and remove the text message icon from the notification bar when recognizing that the user has checked the text message.

Referring to FIG. 3, the controller 110 of the electronic device 100, according to an embodiment of the present disclosure, may display the current time on one side of the notification bar. When detecting a tap event of a stylus 200 generated on the time icon 16 displayed in the notification bar, the controller 110 may control the display unit 131 to display an information providing window 310 with respect to the time icon 16 on the item area 20. The information providing window 310 may include a calendar displaying a current date. However, embodiments of the present disclosure are not limited thereto, and the information providing window 310 may include time information of the world, or a configuration menu capable of configuring the date and time.

An embodiment of the present disclosure described above may provide detailed information (e.g., calendar) associated with the time when selecting the time icon 16 displayed in the notification bar. As described above, the user may easily check the detailed information (i.e., date, day of the week, and so forth) without expanding the notification bar or executing a specific application (e.g., such as a calendar application or a menu for setting a time and date, which are provided by the electronic device). Therefore, an embodiment of the present disclosure may improve the user's convenience.

Figure 4:
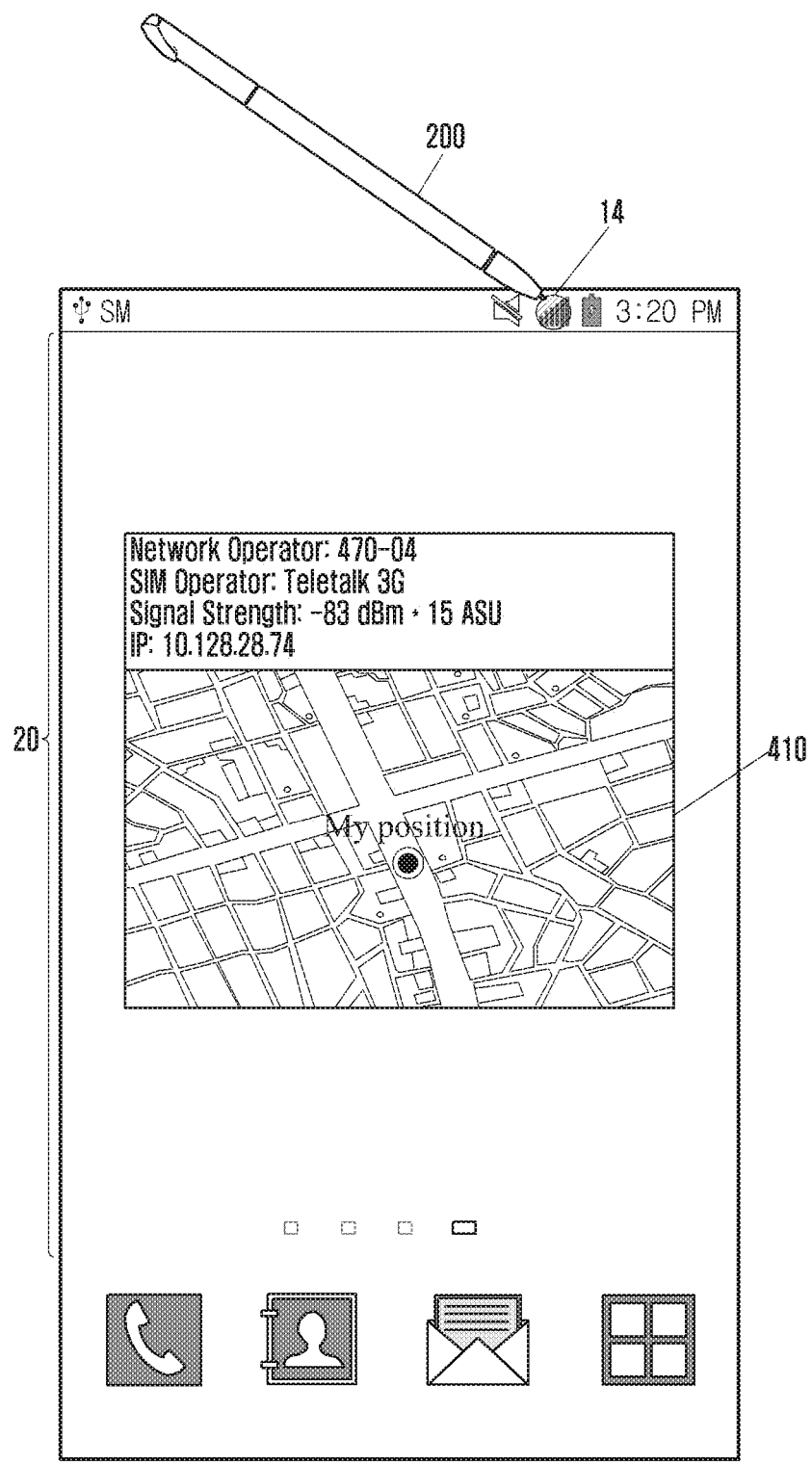

Referring to FIG. 4, the controller 110 of the electronic device 100 according to an embodiment of the present disclosure may display the signal strength icon 14 indicating the strength of the received signal on one side of the notification bar when receiving the signal from the base station. When detecting a tap event of the signal strength icon 14 by the stylus 200, the controller 110 may control the display unit 131 to display the information providing window 410 associated with the signal strength icon 14 on the item area 20. The information providing window 410 may include network operator information, SIM operator information, signal strength information, and internet protocol (IP) information, and a map which displays the current position. This is only an example, and embodiments of the present disclosure are not limited thereto. For example, the information providing window 410 may further include base station information, the cell ID information, and so forth, or may include only some of the above or other information.

An embodiment of the present disclosure as described above may provide detailed information associated with a received signal when selecting the signal strength icon 14 displayed in the notification bar. As described above, the user may easily check the detailed information such as network operator information, accurate signal strength information, and IP information without expanding the notification bar or executing a specific application. Therefore, an embodiment of the present disclosure may improve the user's convenience.

Figure 5:
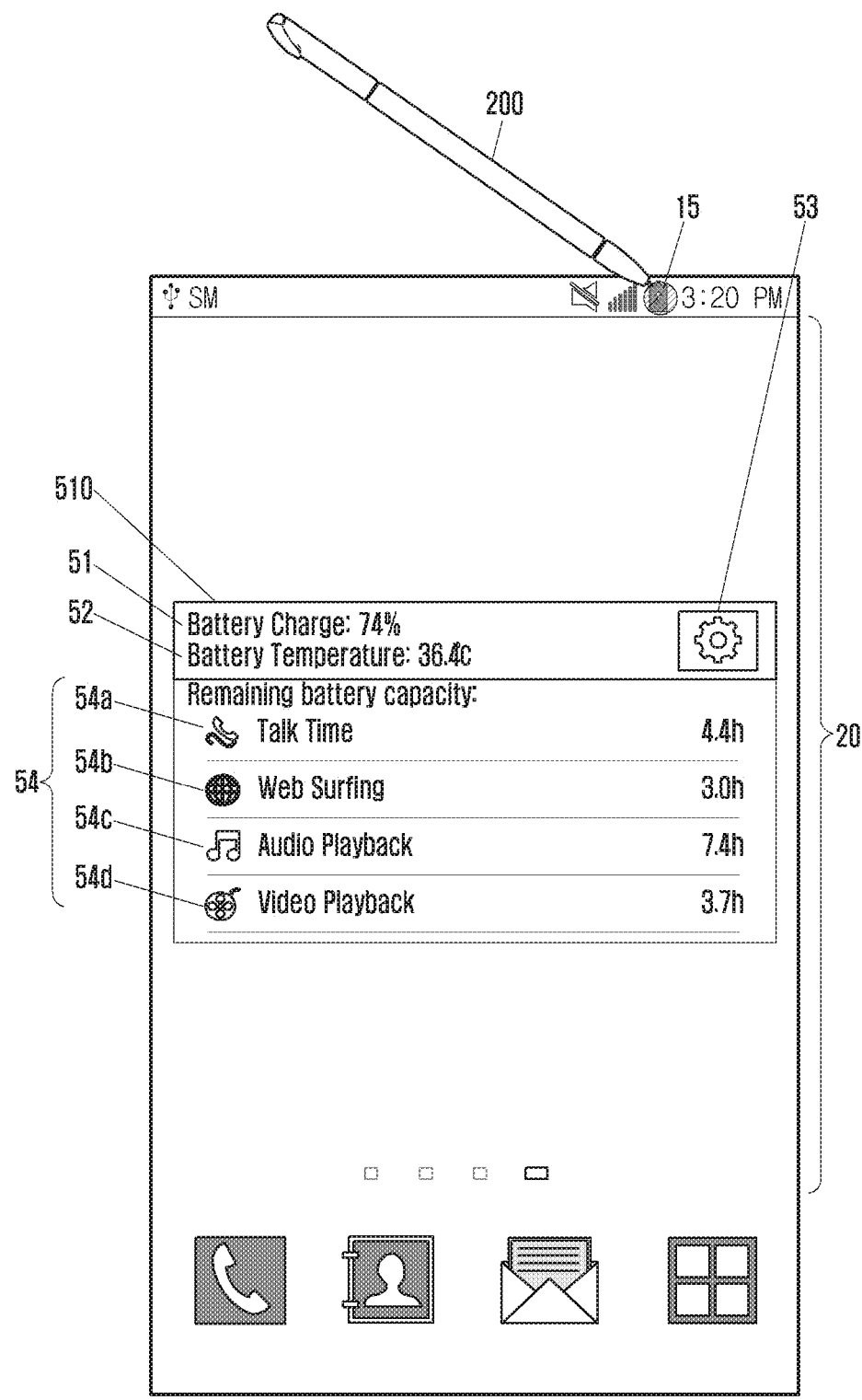

Referring to FIG. 5, the controller 110 of the electronic device 100 according to an embodiment of the present disclosure may display the battery icon 15 on one side of the notification bar at power-on. When detecting a tap event of the battery icon 15 by the stylus 200, the controller 110 may control the display unit 131 to display the information providing window 510 associated with the battery icon 15 on the item area 20. The information providing window 510 may include remaining battery capacity information 51, battery temperature information 52, a configuration menu 53 capable of changing the battery-related configurations, and battery capability information 54 of the current battery. The battery capability information 54 may include available talk time 54a, available web surfing time 54b, available audio playback time 54c, and available video playback time 54d on the basis of the current remaining battery capacity. This is only an example, and embodiments of the present disclosure are not limited thereto. For example, the information providing window 510 may further include the above-mentioned information, estimated time information up to a fully charged state, and application-specific battery usage information, or may include only some of the above or other information.

An embodiment of the present disclosure as described above may provide detailed information associated with a battery when selecting the battery icon 15 displayed in the notification bar. Thus, the user may easily check detailed information on a remaining battery capacity, battery temperature, battery capacity, and so forth without expanding the notification bar or executing a specific application, and easily execute the battery configuration menu. Therefore, an embodiment of the present disclosure may improve the user's convenience.

Figure 6:
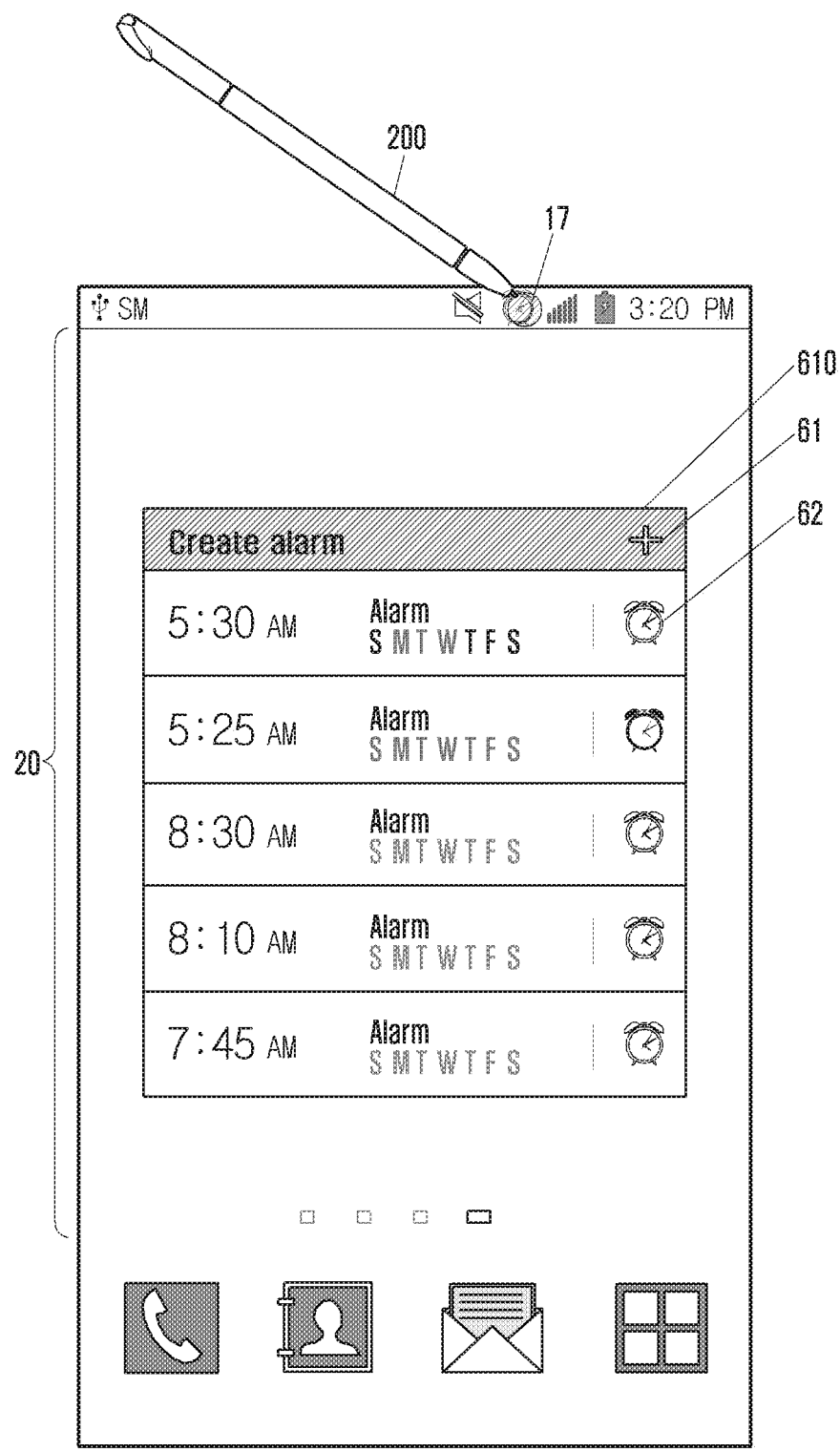

Referring to FIG. 6, the controller 110 of the electronic device 100 according to an embodiment of the present disclosure may display an alarm icon 17 in the notification bar when the alarm is set. When detecting a tap event of the alarm icon 17 by the stylus 200, the controller 110 may control the display unit 131 to display the information providing window 610 associated with the alarm icon 17 on the item area 20. The information providing window 610 may include an alarm addition menu 61 and currently configured alarm information. When any one among a plurality of pieces of alarm information of the information providing window 610 is selected (e.g., touched), the controller 110 may control the display unit 131 to output an alarm setting screen that is capable of changing the selected alarm information. In addition, when detecting the selection (e.g., touch) of a clock icon 62 located on one side of each item of the alarm information, the controller 110 may turn on or off a corresponding alarm associated with the touched clock icon.

The information providing window 610 of FIG. 6 is only an example, and embodiments of the present disclosure are not limited thereto. For example, the information providing window 610 may further include a removal menu for removing the currently set alarm.

An embodiment of the present disclosure as described above may provide detailed information associated with an alarm when selecting the alarm icon 17 displayed in the notification bar. Thus, the user may easily check configured information or easily execute addition of a new alarm, turning off a set alarm, or removal of a set alarm without expanding the notification bar or executing a specific application (e.g., alarm application). Therefore, an embodiment of the present disclosure may improve the user's convenience.

Figure 7:
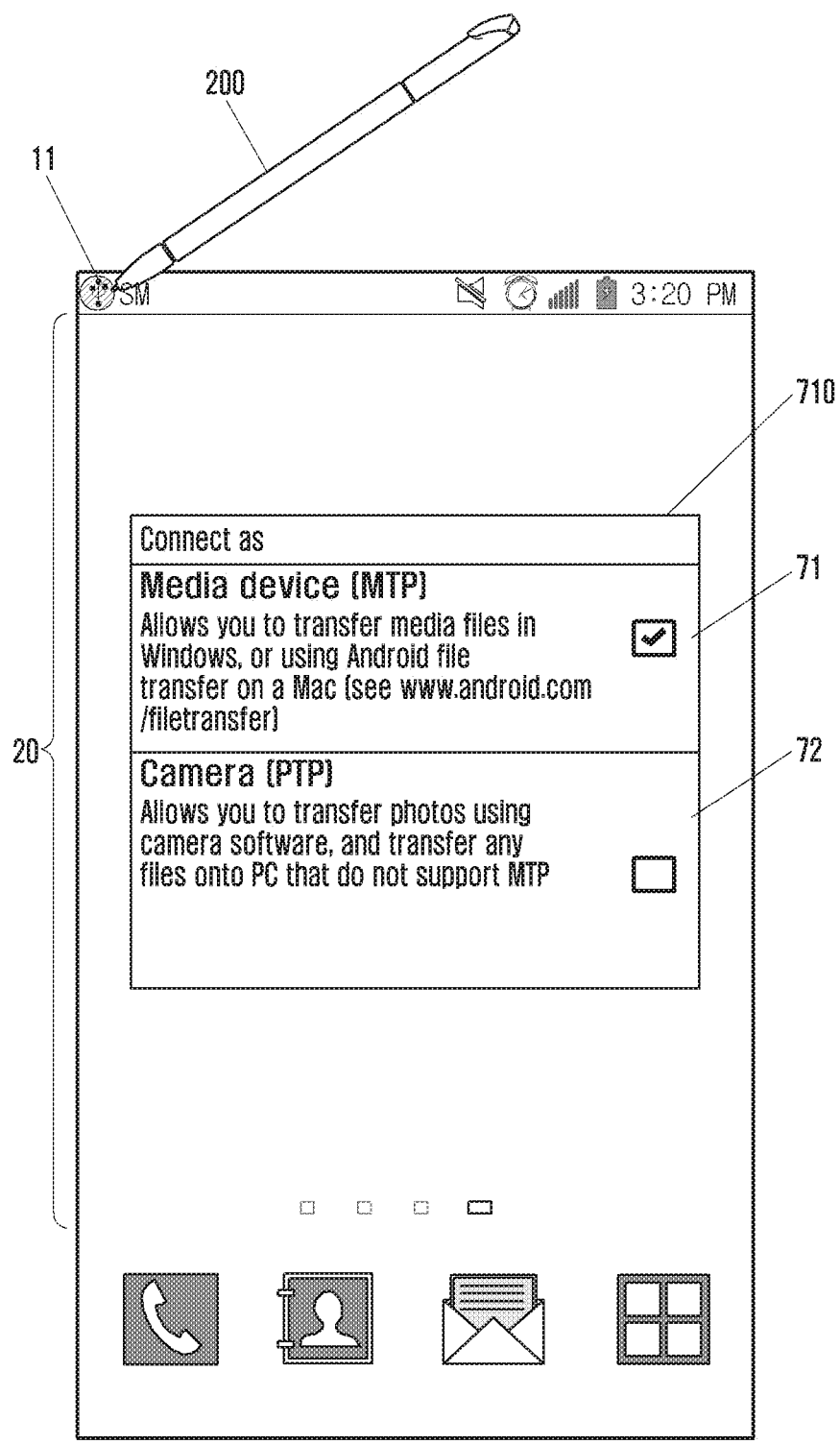

Referring to FIG. 7, the controller 110 of the electronic device 100 according to an embodiment of the present disclosure may display the USB icon 11 in the notification bar when detecting that the external device is connected to the USB I/F 145. When detecting a tap event by the stylus 200 with respect to the USB icon 11, the controller 110 may control the display unit 131 to display an information providing window 710 with respect to the USB icon 11 on the item area 20. The information providing window 710 may include a list of modes to be executed at the time of USB connection. For example, as shown in FIG. 7, the list may include a media transfer protocol (MTP) mode 71 and a photo transfer protocol (PTP) mode 72. This is only an example, and embodiments of the present disclosure are not limited thereto. For example, a list of the information providing window 710 may further include various modes, such as mass storage class (MSC) mode, or include only some of the above or other modes.

An embodiment of the present disclosure as described above may provide detailed information associated with a USB connection when selecting the USB icon 11 displayed in the notification bar. As described above, the user may easily check a current USB connection mode without expanding the notification bar or executing a specific application, and easily change the USB connection mode. Therefore, an embodiment of the present disclosure may improve the user's convenience.

Figure 8:
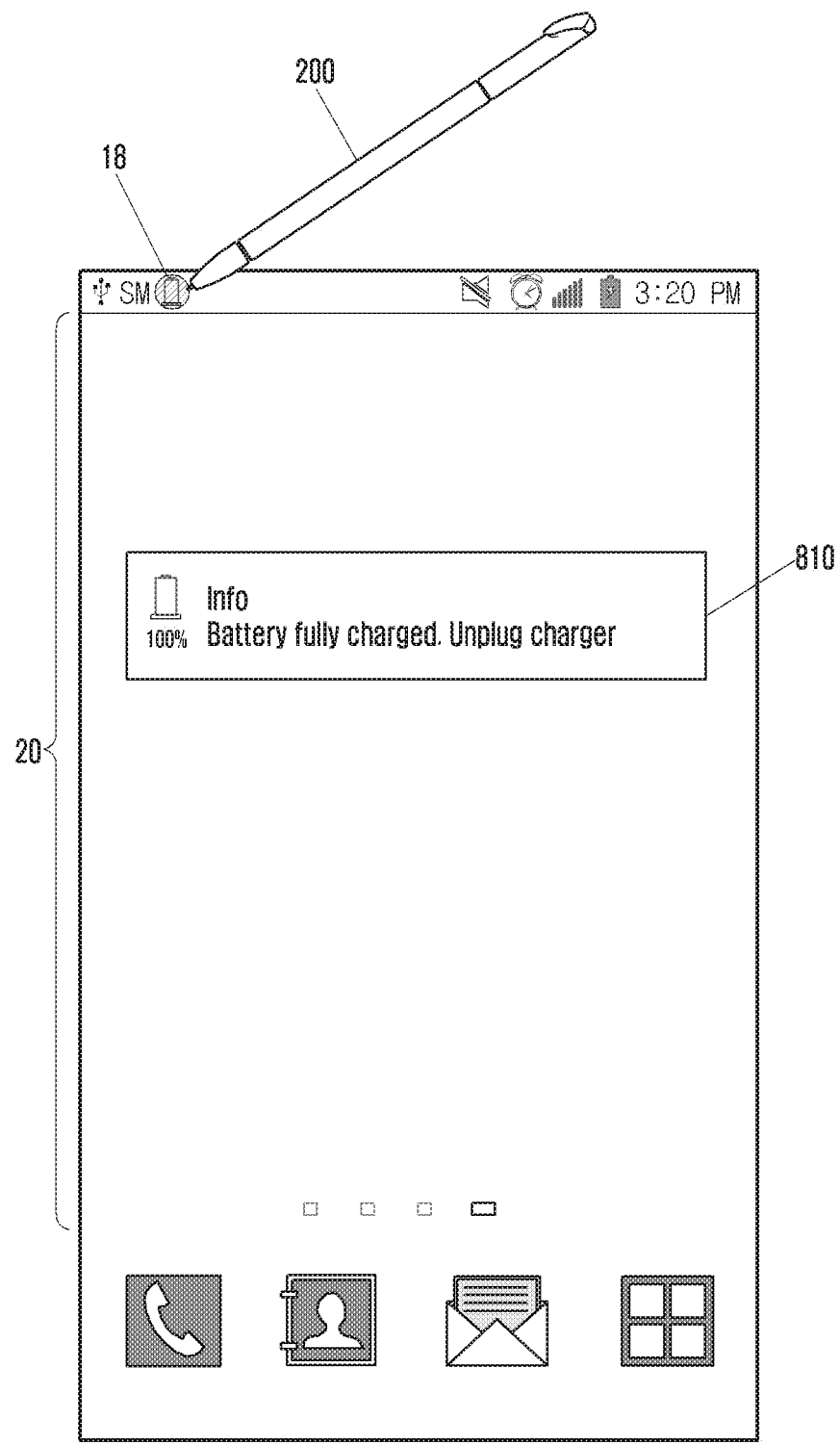
Figure 9:
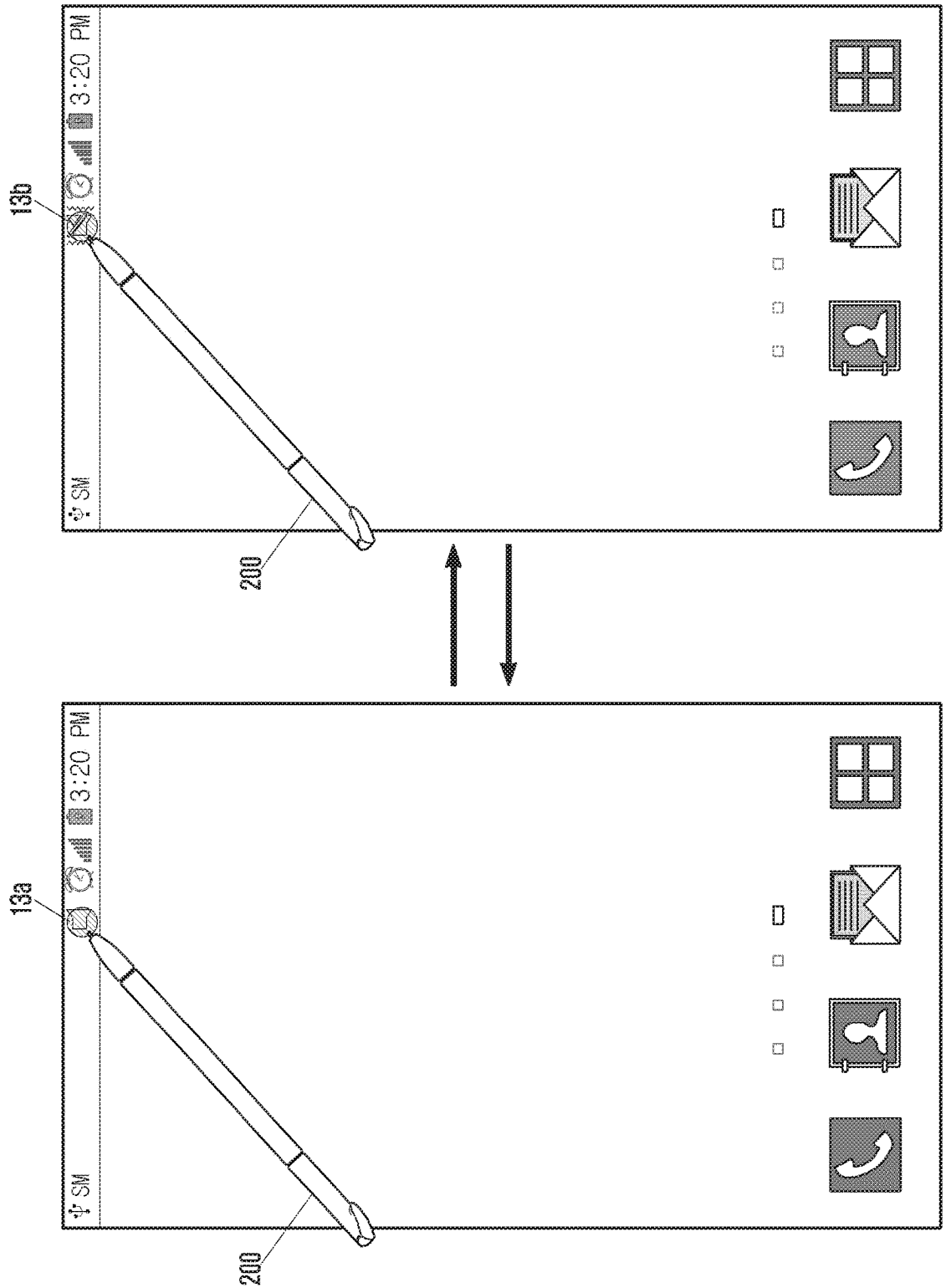

Referring to FIG. 8, the controller 110 of the electronic device 100 according to an embodiment of the present disclosure may display a third party battery icon 18 in the notification bar when a battery information providing application is installed thereon, which is manufactured by a third party. When detecting a tap event by the stylus 200 with respect to the third party battery icon 18, the controller 110 may control the display unit 131 to display the information providing window 810 associated with the third party battery icon 18 on the item area 20. The information providing window 810 may include at least some of the information provided by the battery information providing app. For example, as shown in FIG. 8, the information providing window 810 may include a battery charging level and a help message (e.g., Please unplug the charger). This is only an example, and embodiments of the present disclosure are not limited thereto. For example, the information providing window 810 may further include information such as a battery temperature and a charging rate.

An embodiment of the present disclosure as described above may provide detailed information associated with a battery when selecting the third party battery icon 18 displayed in the notification bar. Thus, the user may easily check battery-related information without expanding the notification bar or executing a specific application. Therefore, an embodiment of the present disclosure may improve the user's convenience.

Referring to FIGS. 9A and 9B, the controller 110 of the electronic device 100 according to an embodiment of the present disclosure may display, in the notification bar, the mode icon 13 indicating a method of notifying of the occurrence of an event at power-on (e.g., sound, vibration, silence, and the like) to the user. When detecting a tap event of the stylus 200 with respect to the mode icon 13, the controller 110 may control the display unit 131 to change a mode and change the mode icon from a form 13a shown in FIG. 9A to a form 13b shown in FIG. 9B corresponding to the changed mode. For example, as shown in FIG. 9A, when detecting the tap event of the sound icon 13a, the controller 110 may change the sound icon 13a to a vibration icon 13b, as shown in in FIG. 9B. At this time, the controller 110 changes an event occurrence notification method from sound to vibration. In a similar manner, as shown in in FIG. 9B, when detecting a tap event of the vibration icon 13b, the controller 110 may change the vibration icon 13b to the sound icon 13a, as shown in FIG. 9A. At this time, the controller 110 changes an event occurrence notification method from vibration to sound.

This is only an example, and embodiments of the present disclosure are not limited thereto. For example, when the electronic device 100 supports an etiquette mode, the controller 110 may change to the vibration icon 13b in response to the tap event of the sound icon 13a, change to a silence icon (not shown) in response to the tap event of the vibration icon 13b, and change to the sound icon 13a in response to the tap event of the silence icon.

According to various embodiments, in response to the tap events of the sound icon 13a, the vibration icon 13b or the silence icon, the controller 110 may output a menu (e.g., a pop-up menu, a pull-down menu, a slide menu, and the like) which can select one of the sound mode, the vibration mode, or the silence mode. When detecting the selection of any one mode, the controller 110 may change the icon from a previous mode to an icon which corresponds to the selected mode.

Various embodiments of the present disclosure described above may change the notification method for the event occurrence when selecting the mode icon 13 displayed in the notification bar, and may change the shape of the mode icon 13 so as to correspond to the changed mode. That is, an embodiment of the present disclosure may easily change a notification method of an electronic device without expanding the notification bar or executing a mode change menu, thereby improving the user's convenience.

Figure 10:
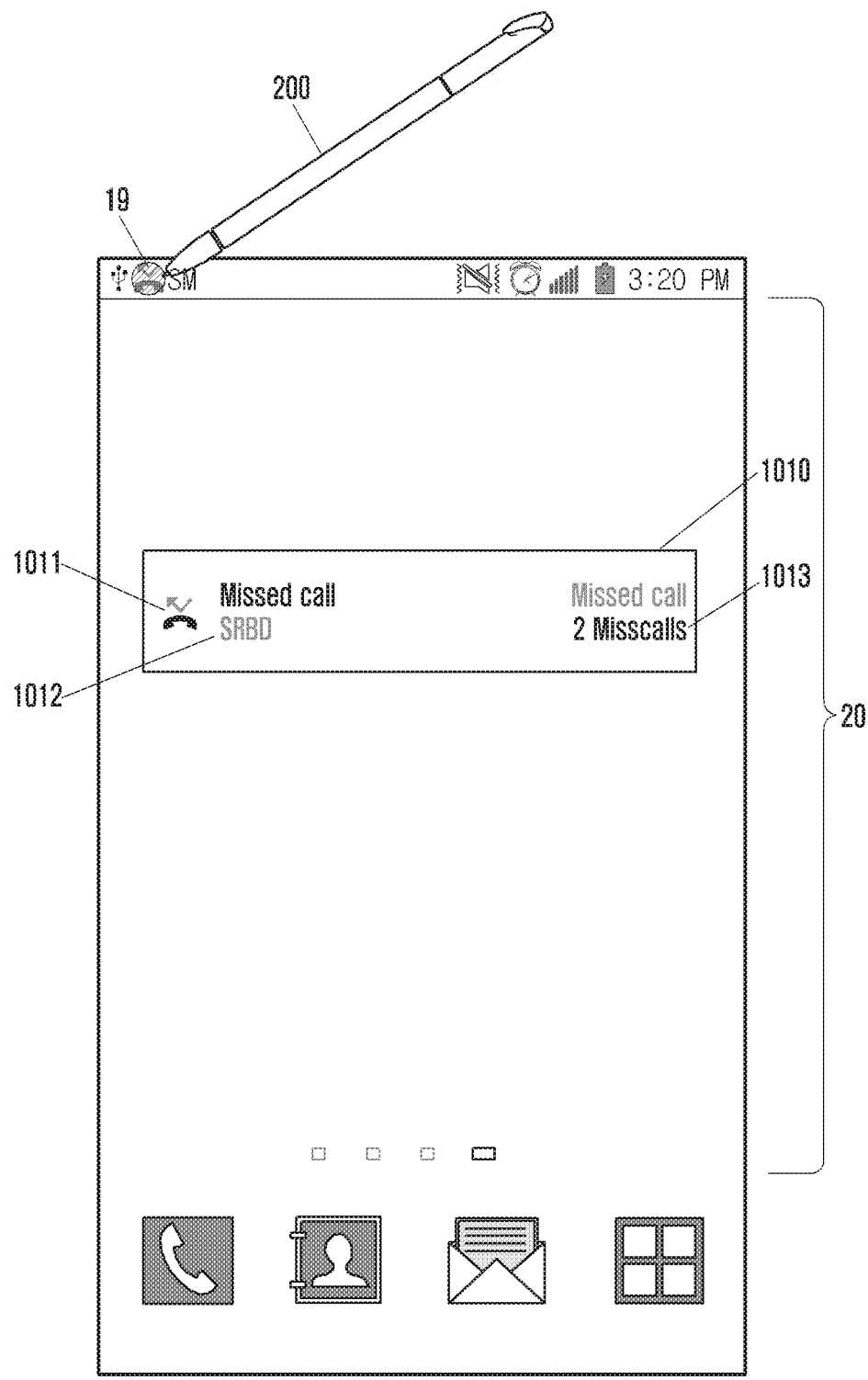
Figure 11:
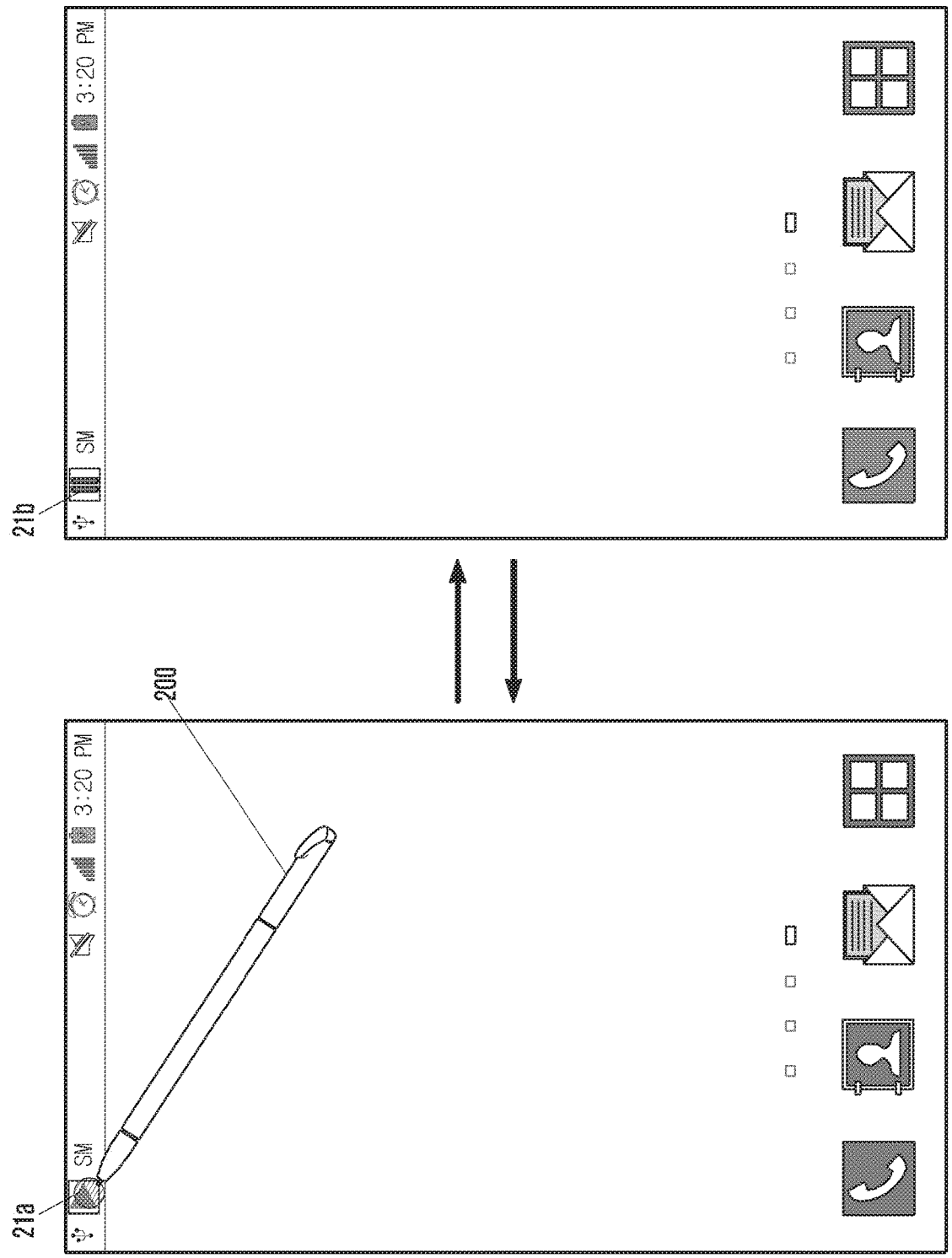

Referring to FIG. 10, the controller 110 of the electronic device 100 according to an embodiment of the present disclosure may display a missed call icon 19 in the notification bar when a missed call occurs. When detecting a tap event of the stylus 200 with respect to the missed call icon 19, the controller 110 may control the display unit 131 to display the information providing window 1010 associated with the missed call icon 19 on the item area 20. The information providing window 1010 may include at least one missed call record. For example, as shown in FIG. 10, the information providing window 1010 may include a missed call icon 1011, a counterparty information 1012, and the number of missed calls 1013. This is only an example, and embodiments of the present disclosure are not limited thereto. For example, FIG. 10 shows that one missed call is displayed, but the information providing window 1010 may include a list of a plurality of missed calls. When including the list of the plurality of missed calls, the information providing window 1010 may be scrolled. In addition, each missed call list of the information providing window 1010 may include a call menu, and a text message menu on one side thereof.

The electronic device according to an embodiment of the present disclosure described above may provide missed call information when selecting the missed call icon 19 displayed in the notification bar. Thus, the user may easily check the missed call information without expanding the notification bar or executing a call application, thereby improving the user's convenience.

Referring to FIGS. 11A and 11B, the controller 110 of the electronic device 100 according to an embodiment of the present disclosure may display a media control icon in the notification bar when a music playback application is executed. For example, as shown in FIG. 11A, the controller 110 may display a music play icon 21a in the notification bar.

When detecting the tap event of the stylus 200 with respect to the music play icon 21a, as shown in of FIG. 11B, the controller 110 may stop the playing of the music and change the music playback icon 21a to a pause icon 21b in the notification bar.

In a similar manner, when detecting a tap event of the pause icon 21b, the controller 110 may again play the music which has been paused, and change the pause icon 21b to the music play icon 21a.

According to various embodiments, when there are a plurality of functions associated with a control for the music playing (e.g., fast-forward, rewind, double-speed playback, volume up, volume down, and so forth), the controller 110 may output a menu (e.g., a pop-up menu, a pull-down menu, a sliding menu, and the like) capable of selecting one among the plurality of functions when detecting the tap event of the music play icon 21a or the pause icon 21b.

The embodiment of the present disclosure described above may control the media playback through the selection of the media control icon (the music play icon 21a or the pause icon 21b). Thus, the user may easily control the media playback without expanding the notification bar or returning to a screen for executing a media playback application, thereby improving the user's convenience.

Figure 12:
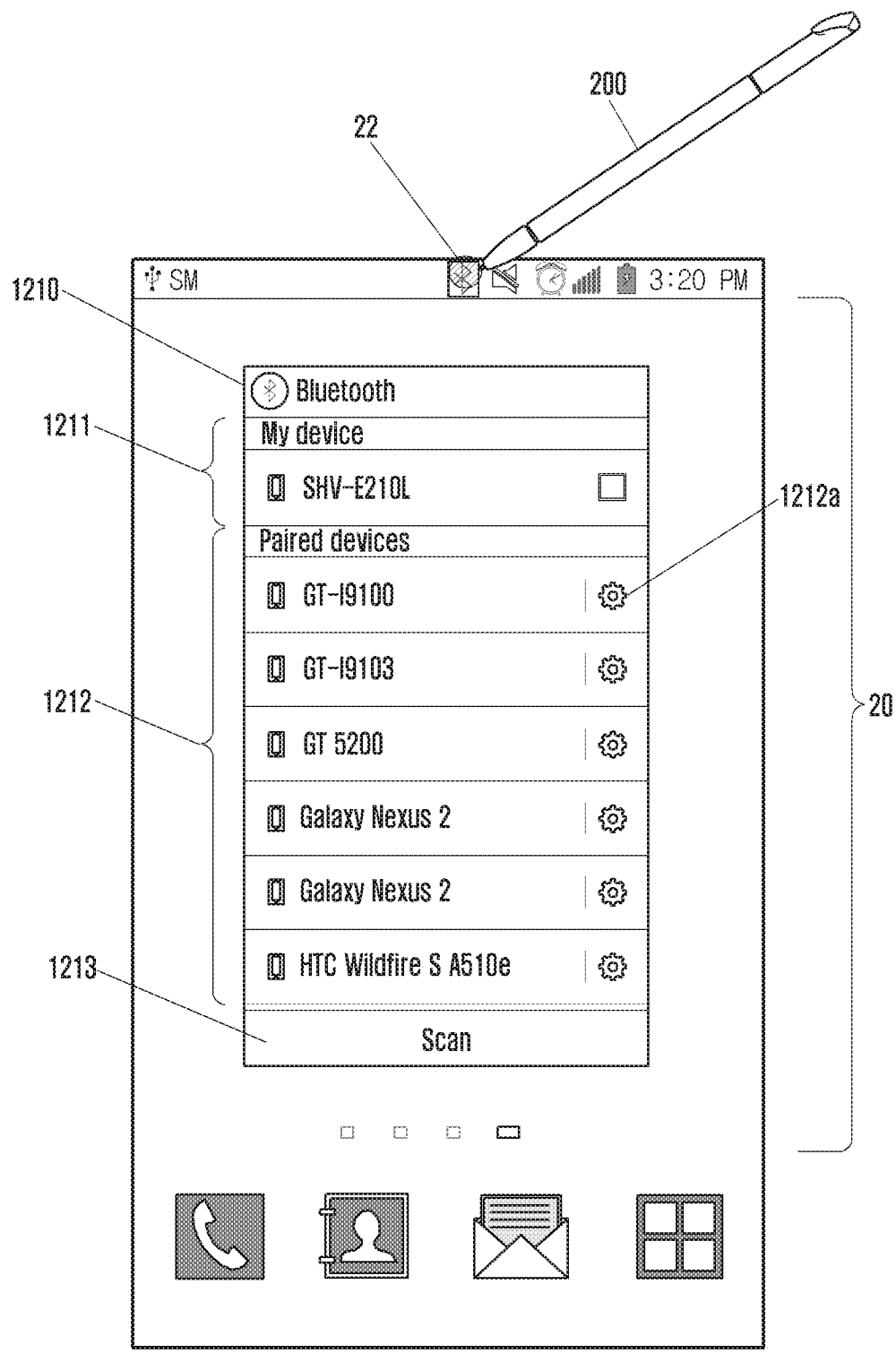
Figure 13:
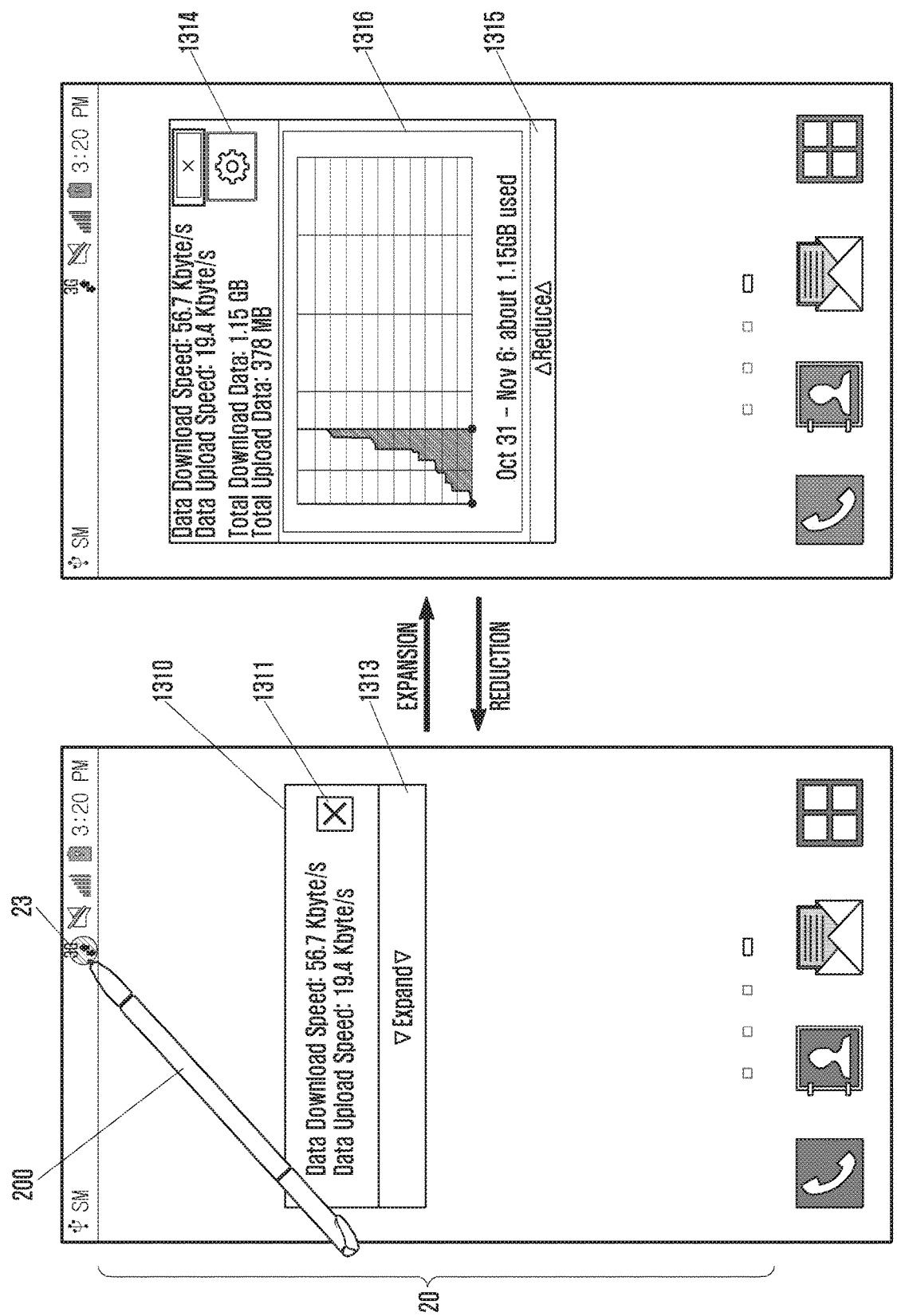

Referring to FIG. 12, the controller 110 of the electronic device 100 according to an embodiment of the present disclosure may display a Bluetooth icon 22 in the notification bar when the BT function is turned on. When detecting a tap event of the stylus 200 with respect to the BT icon 22, the controller 110 may control the display unit 131 to display the information providing window 1210 for the Bluetooth icon 22 on the item area 20. The information providing window 1210 may include information 1211 on the electronic device 100, information 1212 on a paired electronic device, and a scan menu 1213. The information 1212 on the paired electronic device may include a configuration menu 1212a for detailed configuration of the Bluetooth connection on one side thereof, respectively. This is only an example, and embodiments of the present disclosure are not limited thereto. For example, when the electronic device 100 provides a tethering function using BT, that is, when another electronic device is connected via BT to the Internet, the controller 110 may display download and upload speed information on the information providing window 1210.

An embodiment of the present disclosure as described above may provide detailed information associated with Bluetooth when selecting the Bluetooth icon 22 displayed in the notification bar. Thus, an embodiment of the present disclosure may easily check information associated with Bluetooth without expanding the notification bar or executing a BT menu, thereby improving the user's convenience.

Referring to FIGS. 13A and 13B, the controller 110 of the electronic device 100 according to an embodiment of the present disclosure may display a data icon 23 in the notification bar when configured so as to use data networks (e.g., 2G, 3G, 4G, and 5G mobile communication networks). When detecting a tap event of the stylus 200 with respect to the data icon 23 as shown in FIG. 13A, the controller 110 may control the display unit 131 to display the information providing window 1310 associated with the data icon 23 on the item area 20. The information providing window 1310 may include a download speed and upload speed of the data. Further, the information providing window 1310 may further include a removal menu 1311 and an expanded menu 1313.

When detecting the touch event (e.g., tap) of the removal menu 1311, the controller 110 may remove the information providing window 1310. When detecting the touch event of the expanded menu 1313 (e.g., tap), as shown in FIG. 13B, the controller 110 may expand the information providing window 1310 and further display additional information. The additional information may include total download data amounts, total upload data amounts, a configuration menu 1314, a reduced menu 1315 and a use amount graph 1316. The controller 110 may change the expanded menu 1313 to the reduced menu 1315.

The information providing window 1310 of FIGS. 13A and 13B is only an example, and embodiments of the present disclosure are not limited thereto. For example, the information providing window 1310 according to another embodiment of the present disclosure may display downloaded data amounts, uploaded data amounts, and download speed for each application.

An embodiment of the present disclosure as described above may provide detailed information associated with a data network when selecting the data icon 23 displayed in the notification bar. Thus, an embodiment of the present disclosure may easily check detailed information on the network to which an electronic device is connected, without expanding the notification bar or executing a network configuration menu, and thereby improving the user's convenience.

Figure 14:
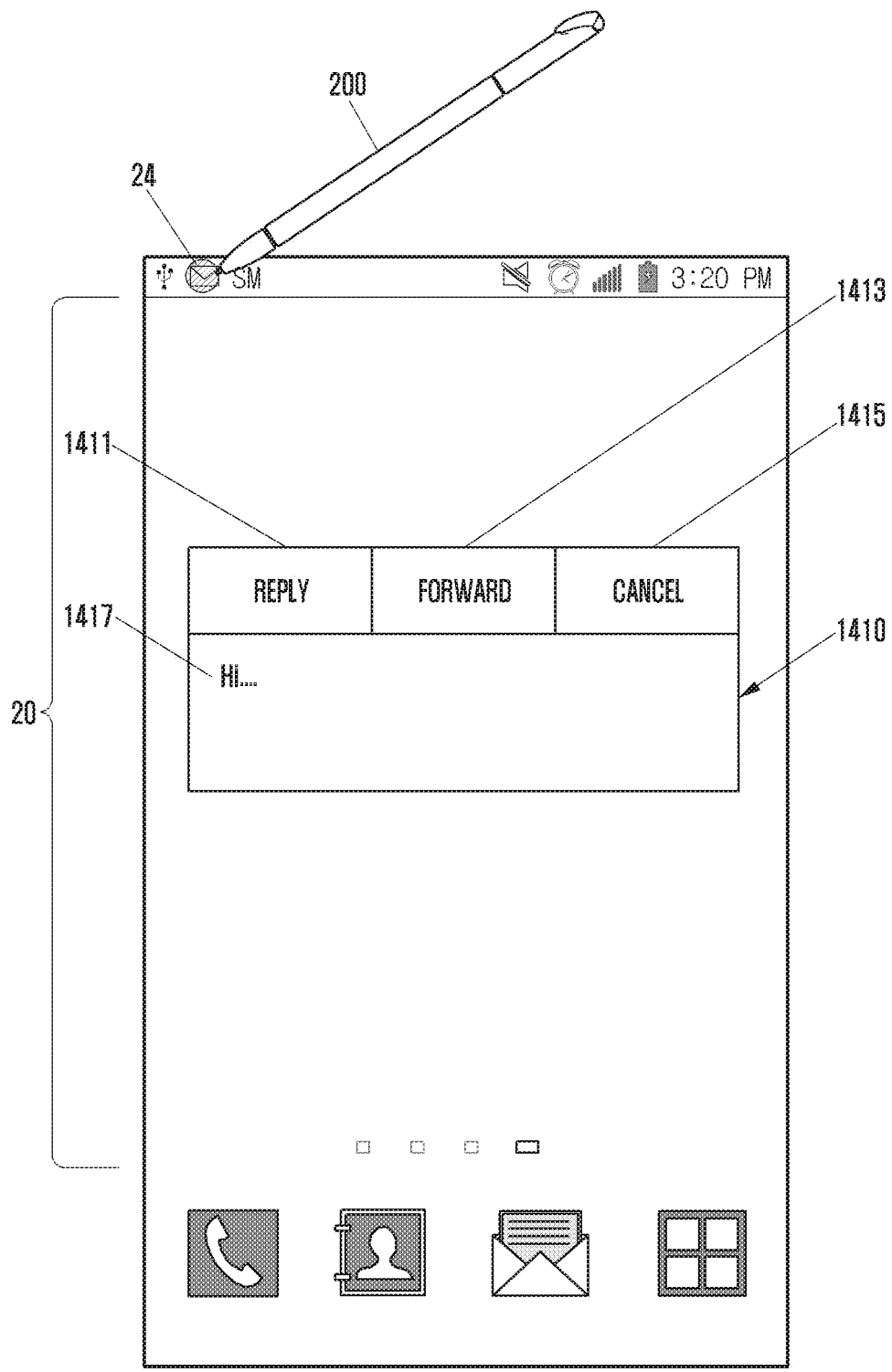

Referring to FIG. 14, the controller 110 of the electronic device 100 according to an embodiment of the present disclosure may display a text message icon 24 in the notification bar when receiving a text message. When detecting a tap event of the stylus 200 with respect to the text message icon 24, the controller 110 may control the display unit 131 to display the information providing window 1410 associated with the text message icon 24 on the item area 20. The information providing window 1410 may include a reply menu 1411, a forward menu 1413, a cancel menu 1415, and a received message 1417. This is only an example, and embodiments of the present disclosure are not limited thereto. For example, the information providing window 1410 may further include a photographing menu for transmitting a multimedia message, a file (e.g., image or video) addition menu, and so forth.

The embodiment of the present disclosure described above may easily check the contents of the text message through the selection of the text message icon 24 displayed in the notification bar, and easily perform a reply for the received text message or forwarding thereof. Thus, an embodiment of the present disclosure may solve the conventional inconveniences of expanding the notification bar or executing a text message application by the user.

Figure 15:
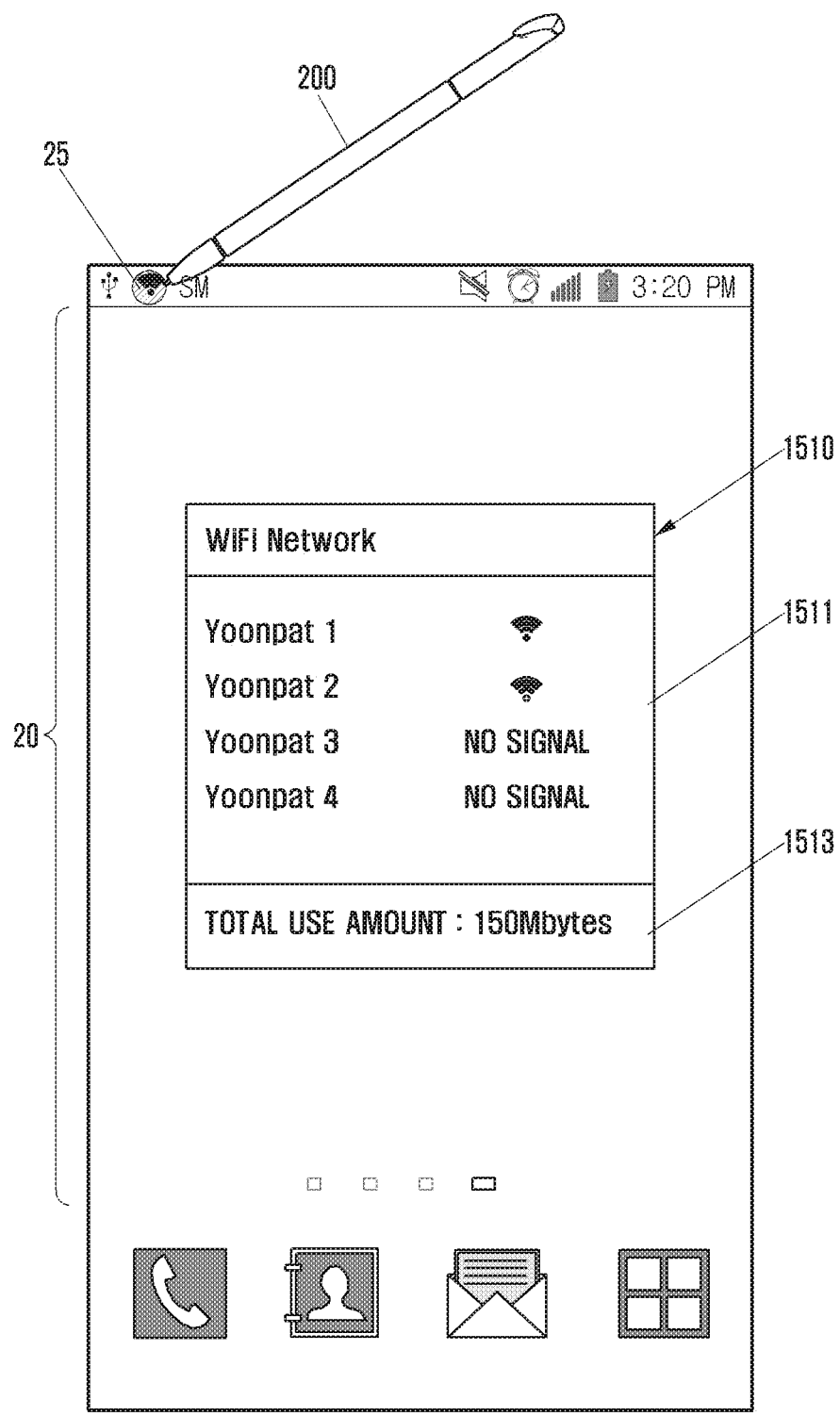

Referring to FIG. 15, the controller 110 of the electronic device 100 according to an embodiment of the present disclosure may display a Wi-Fi icon 25 in the notification bar when a Wi-Fi function is turned on. When detecting a tap event of the stylus 200 with respect to the Wi-Fi icon 25, the controller 110 may control the display unit 131 to display the information providing window 1510 associated with Wi-Fi on the item area 20. The information providing window 1510 may include a list 1511 of detected APs, previously connected APs, and a total use amount 1513. This is only an example, and embodiments of the present disclosure are not limited thereto. For example, only currently connectable APs may be included in the list in the information providing window 1510. In various embodiments, the information providing window 1510 may display the data use amount for each AP.

The embodiment of the present disclosure described above may easily check detailed information through the selection of the Wi-Fi icon 25 displayed in the notification bar without expanding the notification bar or executing a Wi-Fi configuration menu. Thus, an embodiment of the present disclosure may solve the conventional inconveniences of expanding the notification bar or executing the Wi-Fi configuration menu by the user.

Figure 16:
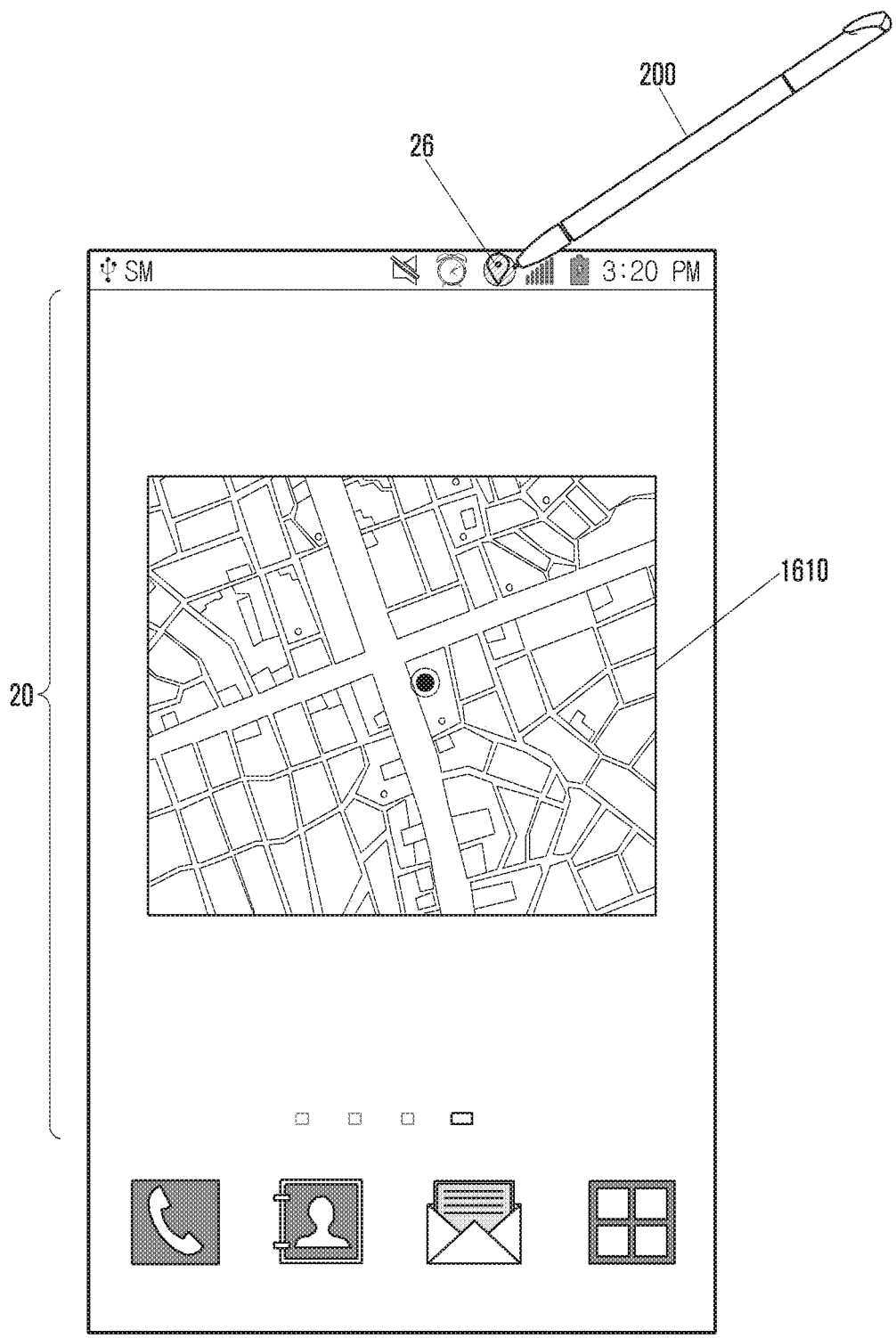

Referring to FIG. 16, the controller 110 of the electronic device 100 according to an embodiment of the present disclosure may display a map icon 26 in the notification bar when a map application is executed. When detecting a tap event of the stylus 200 with respect to the map icon 26, the controller 110 may control the display unit 131 to display the information providing window 1610 associated with the map icon 26 on the item area 20. The information providing window 1610 may include a map indicating the current location of the electronic device 100. This is only an example, and embodiments of the present disclosure are not limited thereto. For example, the information providing window 1610 may display a most recently visited location, home, office, the most frequently visited location, and so forth based on GPS data.

The embodiment of the present disclosure described above may easily check detailed information through the selection of the map icon 26 displayed in the notification bar without expanding the notification bar or executing the map application. Thus, the embodiment of the present disclosure can improve the user's convenience.

Figure 17:
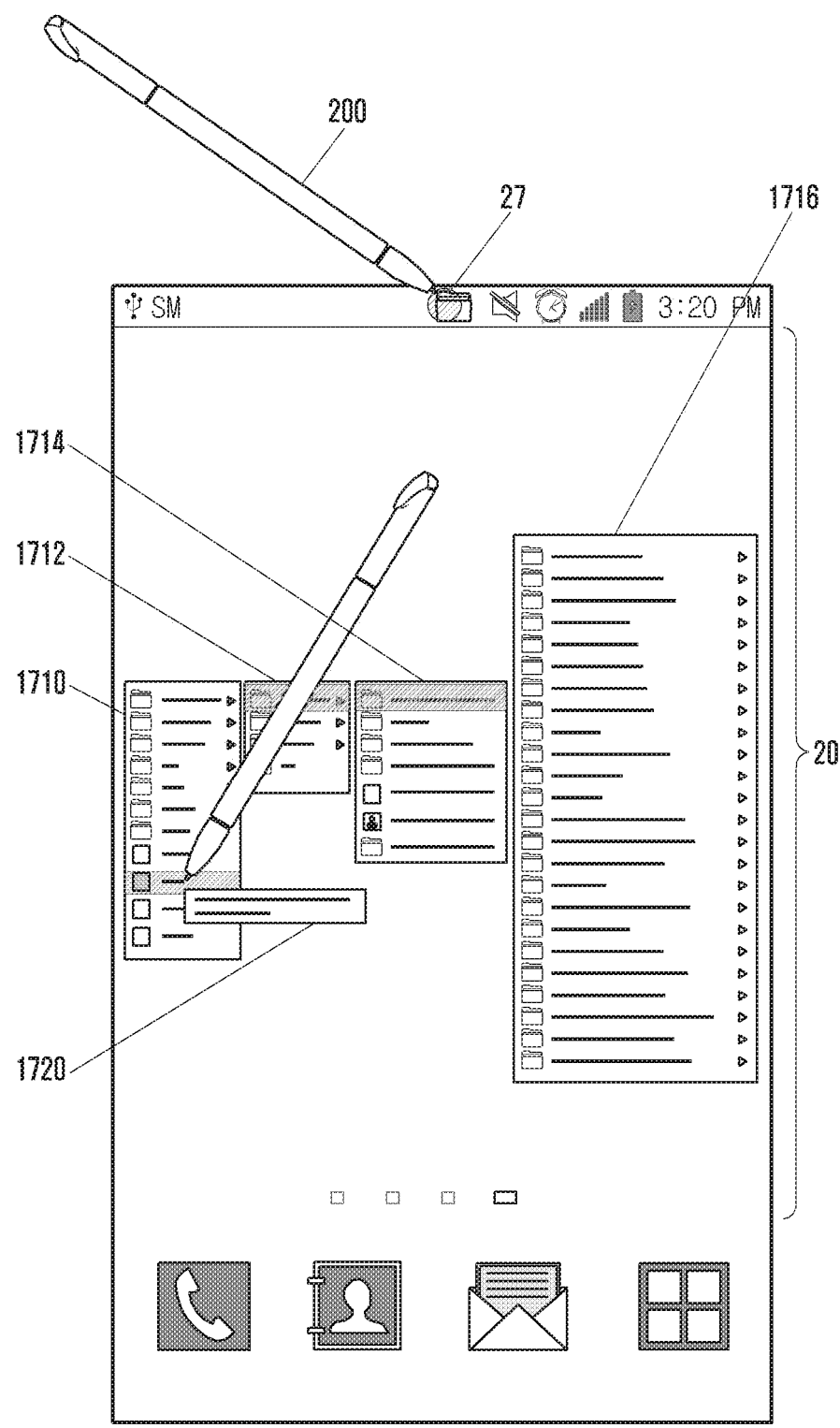

Referring to FIG. 17, the controller 110 of the electronic device 100 according to an embodiment of the present disclosure may display a memory icon 27 in the notification bar when an external memory (e.g., an SD card) is mounted thereto. When detecting a tap event of the stylus 200 with respect to the memory icon 27, the controller 110 may control the display unit 131 to display a file discovery window 1710 of the external memory on the item area 20. When detecting a hovering of the stylus 200 over a particular file in the file discovery window 1710, the controller 110 may output a pop-up window 1720 including the description of the particular file around the particular file. In addition, when detecting a tap on the specific file, the controller 110 may control the display unit 131 to output the second discovery window 1712 including a sub-directory of the selected particular file. Similarly, the controller 110 may control the display unit 131 to output a third discovery window 1714 when a particular file is selected in the second discovery window 1712, and to output a fourth discovery window 1716 when a particular file is selected in the third discovery window 1714.

FIG. 17 has been described with an external memory as an example, but it will be obvious to a person skilled in the art that an embodiment of the present disclosure may be applied to the internal memory of the electronic device 100.

The embodiment of the present disclosure described above may display the memory icon 27 in the notification bar, and display the discovery window of the memory upon selection of the memory icon 27. Accordingly, the embodiment of the present disclosure may allow a user to easily and conveniently discover an external or internal memory without executing a file discovery application.

FIGS. 3 to 17 have described that the information providing windows are displayed in an item area 20. However, various embodiments of the present disclosure are not limited thereto. For example, the information providing windows may be displayed as a pop-up window in a form of a text balloon around the selected item.

Figure 18:
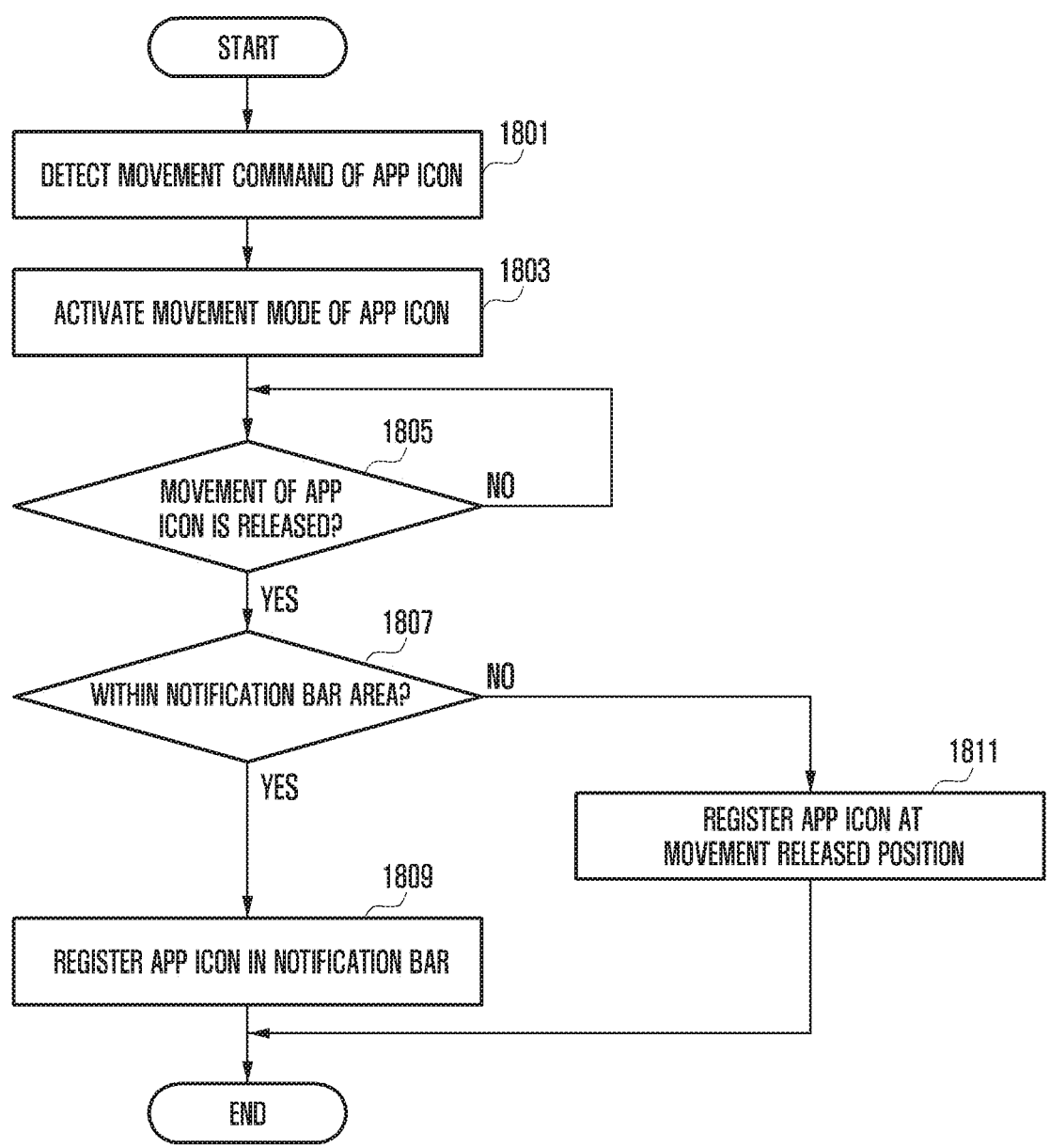
FIG. 18 is a flowchart illustrating a method for registering an app icon in a notification bar according to an embodiment of the present disclosure.

FIG. 18 is a flowchart illustrating a method for registering an app icon in a notification bar according to an embodiment of the present disclosure.

Figures 19A, 19B:
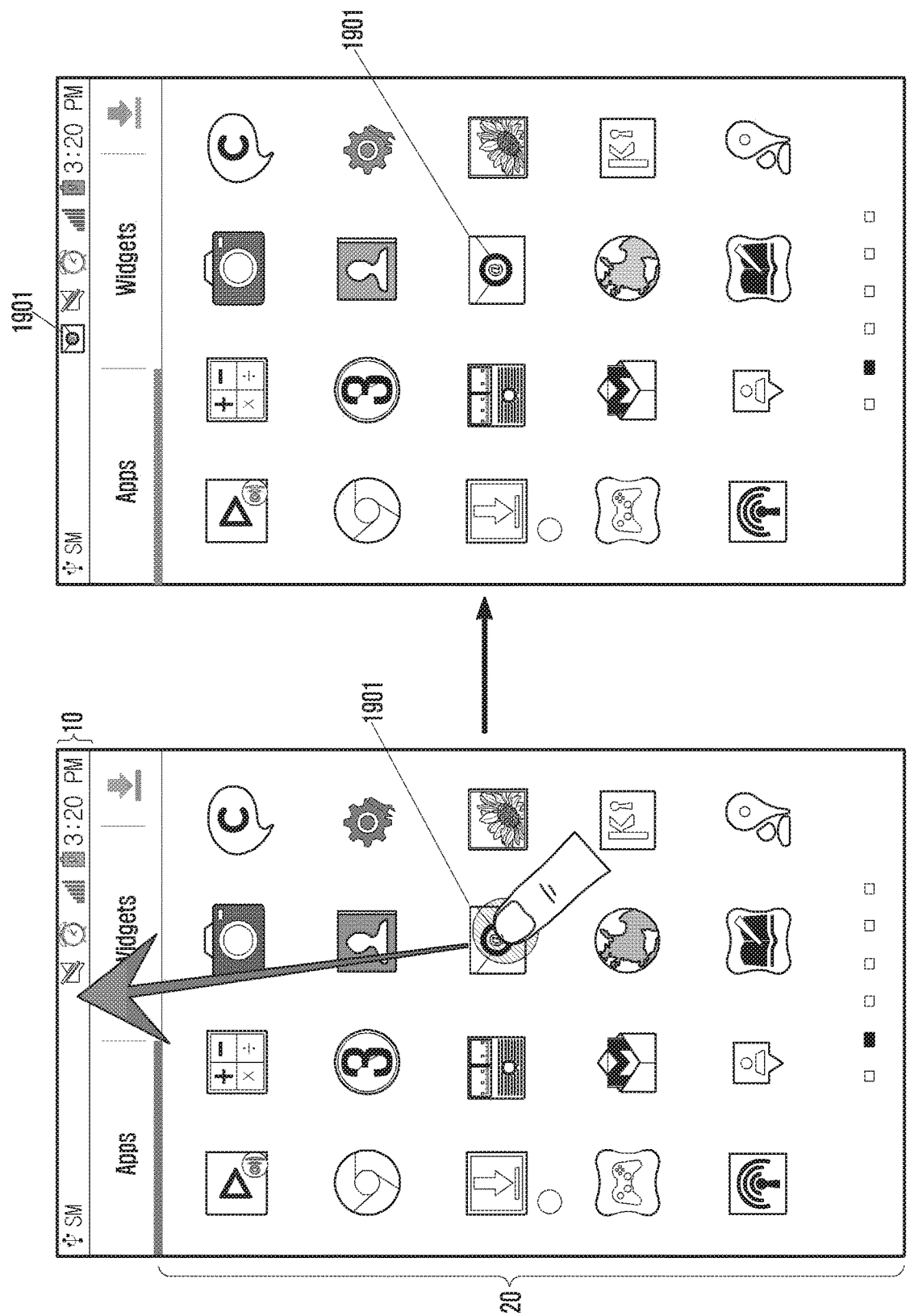
FIGS. 19A and 19B are diagrams of a screen for illustrating a method for registering an app icon in a notification bar according to an embodiment of the present disclosure.

FIGS. 19A and 19B are diagrams of screens for illustrating a method for registering an app icon in a notification bar according to an embodiment of the present disclosure.

Referring to FIGS. 18, 19A and 19B, the controller 110 of an electronic device 100 according to an embodiment of the present disclosure may detect a movement command of an app icon located in the item area 20 in operation 1801. The movement command of the app icon may be a touch, a long touch, a double touch, a multi-touch, gestures of specific patterns, and so forth. In the following, a description will be made with the movement command being a long touch as an example.

When detecting the movement command of the app icon, the controller 110 may activate the movement mode of the app icon in operation 1803. When activating the moving mode of the app icon, the long touched app icon may be floated from the screen. At this time, the user may drag and move the app icon to a desired position.

The controller 110 may check that the movement of the app icon is released in operation 1805. When the movement of the app icon is not released, the controller 110 may repeat the operation 1805. When the movement of the icon of the app is released, the controller 110 may proceed to operation 1807 and check whether the moved app icon is placed in the notification bar area 10.

When the position of the moved app icon is in the notification bar area 10, the controller 110 may proceed to operation 1809 and register the app icon in the notification bar. For example, as shown in FIG. 19A, the user may move an e-mail icon 1901 from the item area 20 to the notification bar area 10 after long touching the e-mail icon 1901. When the movement is released in the notification bar area 10, as shown in FIG. 19B, the controller 110 may register the email icon 1901 in the notification bar. At this time, the e-mail icon 1901 registered in the notification bar 1901 may be controlled to adjust (e.g. decrease) the size to fit the size of the notification bar. Referring to FIG. 19B, even though the e-mail icon 1901 is registered in the notification bar, the e-mail icon 1901 is not removed from the item area 20. However, according to another embodiment of the present disclosure, the e-mail icon 1901 may be removed from the item area 20.

Returning to FIG. 18, in operation 1807, when the position of the moved app icon is not in the notification bar area 10, the controller 110 may proceed to operation 1811 and register the app icon at a position where movement is released. At this time, when the icon of the moved app and another app icon are overlapped with each other, the controller 110 may move the other app icon to another position (e.g., to the right), and register the moved app icon to the corresponding position.

The embodiment of the present disclosure described above may touch and drag icons positioned in the item area 20 and register the icons in the notification bar. An embodiment of the present disclosure as described above may allow a user to freely register the app icon. Thereafter, the user may easily check simple information and detailed information through the selection (e.g., hovering, touch, long touch, multi-touch, double touch, and so forth) of the app icon registered in the notification bar, and immediately execute the application corresponding to the app icon.

Figure 20:
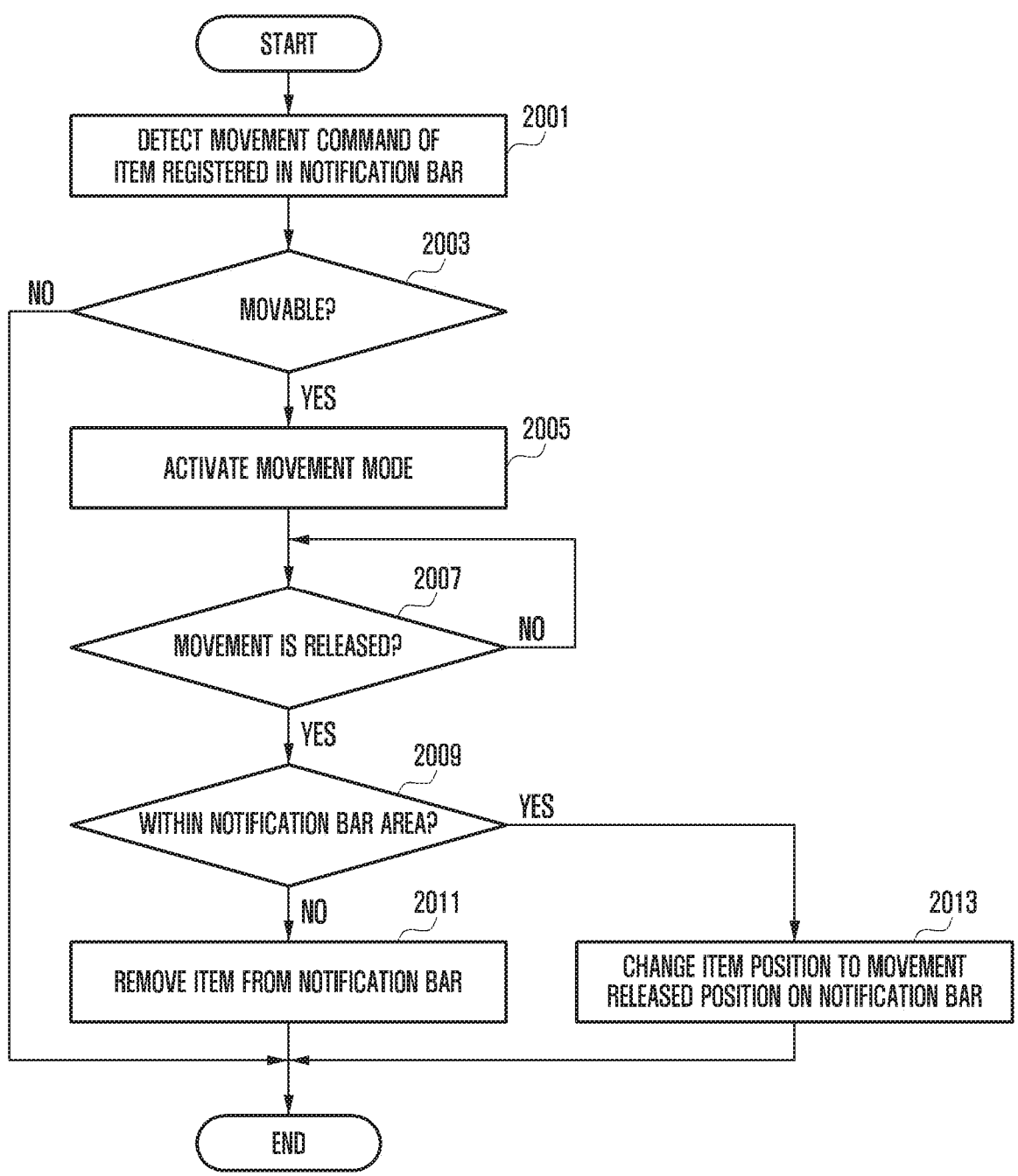
FIG. 20 is a flowchart illustrating a method for removing an app icon from a notification bar according to an embodiment of the present disclosure.

FIG. 20 is a flowchart illustrating a method for removing an app icon in a notification bar according to an embodiment of the present disclosure.

Figure 21:
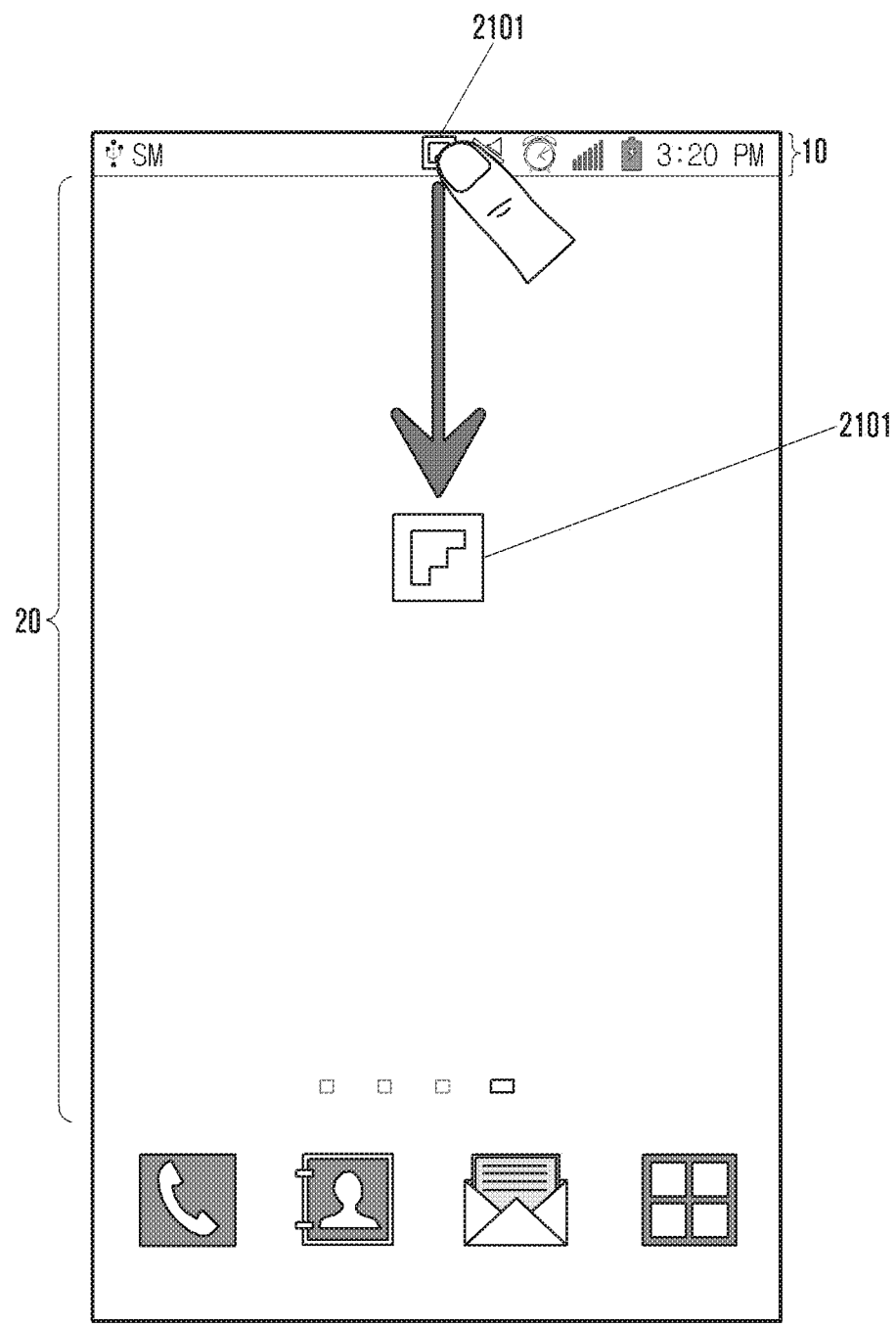
FIG. 21 is a diagram of a screen for illustrating a method for removing an app icon from a notification bar according to an embodiment of the present disclosure.

FIG. 21 is a diagram of a screen for illustrating a method for removing an app icon in a notification bar according to an embodiment of the present disclosure.

Referring to FIGS. 20 and 21, the controller 110 of the electronic device 100 according to an embodiment of the present disclosure may detect the movement command of the item registered in the notification bar in operation 2001. The item may be an app icon, an icon, a text/numeral, and so forth. The movement command may be a touch, a long touch, a double touch, and a multi-touch of the item, gestures of specific patterns, and so forth. In the following, a description will be made with the movement command being a long touch as an example, for convenience of explanation.

When detecting the movement command of the icon in operation 2001, the controller 110 may identify whether the item is movable in operation 2003. When all the items that are registered in the notification bar are movable, operation 2003 may be omitted. In the following, it will be described on the assumption that only the app icon is movable, for convenience of explanation. For example, operation 2003 may be an operation of checking whether the item is an app icon.

In operation 2003, when the item is identified as being non-movable, the controller 110 may ignore the movement command and terminate a procedure for removing the app icon. According to various embodiments, when the movement of the item is not possible, for example, when the item is not an app icon, the controller 110 may display, on the screen, a pop-up window notifying that the movement of the item is not possible.

When the item is identified as being movable in operation 2003, for example, when the object is an app icon, the controller 110 may proceed to operation 2005 and activate the movement mode. When the movement mode is activated, the user may drag and move the item to a desired position.

The controller 110 may check whether the movement of the app icon is released in operation 2007. When the movement of the app icon is not released, the controller 110 may repeat the operation 2007. In various embodiments, when the movement of the icon of the application is released, the controller 110 may proceed to operation 2009 and check whether the moved app icon is placed in the notification bar area 10.

In operation 2009, when the position of the moved item is in a notification bar area 10, the controller 110 may proceed to operation 2013 and change the position of the item to the position of the notification bar in which the movement is released. In operation 2009, when the position of the moved item is not in the notification bar area 10, for example, when the item is moved to elsewhere in the item area 20, the controller 110 may proceed to operation 2011 and remove the item from the notification bar. The removed item may be registered in the item area 20.

For example, as shown in FIG. 21, the user may move an application icon 2101 to the item area 20 after long touching the app icon 2101 registered in the notification bar. At this time, although not shown; the app icon 2101 is removed from the notification bar. In addition, the app icon 2101 which has been moved to the item area 20 may be controlled to adjust (e.g., increase) the size to a scale better fitting the item area 20.

In various embodiments, the app icon 2101 which has been removed from the notification bar may not be registered in the item area 20. For example, as shown in FIG. 19, when registering the app icon 1901 in the notification bar, and if the app icon is not removed from the item area 20, the app icon 1901 which has been removed from the notification bar may not be registered in the item area 20.

In various embodiments, when the app icon has been moved from the notification bar to the item area 20 and then removed, it is checked whether the removed app icon exists in the item area 20, and when the removed app icon from the notification bar does not exist in the item area 20, the removed app icon from the notification bar may be registered in the item area 20.

In the embodiment of the present disclosure described above, the app icons registered in the notification bar may be removed through a simple interaction (e.g., dragging after long touching). Thus, embodiments of the present disclosure allow a user to easily remove an object registered in the notification bar.

According to various embodiments, at least some of the devices (e.g., modules or functions thereof) or the method (e.g., operations) according to the present disclosure may be implemented by a command stored in a computer-readable storage medium in a programming module form. When the command is executed by one or more processors (e.g., the controller 110), the one or more processors may execute a function corresponding to the command At least some of the programming modules may be implemented (e.g., executed) by, for example, the processor. At least some of the programming modules may include, for example, a module, a program, a routine, a set of instructions or a process for performing one or more functions.

The computer readable recording medium may include magnetic media such as a hard disc, a floppy disc, and a magnetic tape, optical media such as a compact disc read only memory (CD-ROM) and a DVD, magneto-optical media such as a floptical disk, and hardware devices specifically configured to store and execute program commands, such as a read only memory (ROM), a random access memory (RAM), and a flash memory. In addition, the program instructions may include high class language codes, which can be executed in a computer by using an interpreter, as well as machine codes made by a compiler. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

While the present disclosure has been shown and described with reference to various embodiments thereof, it will be understood by those skilled in the art that various changes in form and detail may be made therein without departing from the spirit and scope of the present disclosure as defined by the appended claims and their equivalents.

What is claimed is:

1. An electronic device comprising:
a touch screen; a memory; and at least one processor configured to:
detect an input moving an application icon, from an item area on the touch screen including at least one application icon, to a notification bar displayed on the touch screen, register the moved application icon in the notification bar, display an item, in the notification bar, corresponding to the moved application icon, detect a selection of the item in the notification bar, in response to the selection of the item in the notification bar, determine whether there is detailed information associated with the registered application icon, in response to determining that there is detailed information associated with the item, control the touch screen to display a popup window displaying the detailed information without expanding the notification bar and without executing the application corresponding to the item, in response to determining that there is no detailed information associated with the item, perform a function corresponding to the item; display a memory icon in the notification bar when an external memory is mounted to the electronic device, in response to a tap event on the memory icon, display in the item area a file discovery window of the external memory, in response to detecting a hovering over a particular file in the file discovery window, output in a vicinity of the particular file a second popup window including a description of the particular file, and in response to a tap input selecting the particular file, display a second discovery window including a sub-directory of the selected particular file.

2. The electronic device of claim 1, wherein the at least one processor is further configured to:
remove the popup window displaying the detailed information when a predetermined time has elapsed after outputting the detailed information, or based on an input of a signal for removing the detailed information.

3. The electronic device of claim 1, wherein the at least one processor is further configured to:
change a size of the popup window based on an input of a signal for changing the size of the popup window.

4. The electronic device of claim 1, wherein the at least one processor is further configured to:

detect an input moving the item corresponding to the application icon from the notification bar to the item area, remove the application icon registered from the notification bar, and cease displaying the item corresponding to the application icon in the notification bar.

5. The electronic device of claim 1, wherein the detailed information comprises at least one menu for performing the function corresponding to the item.

6. The electronic device of claim 1, wherein the selection of the item comprises at least one of a hovering of a touch input tool, a tap, a double-touch, a multi-touch, or a gesture.

7. A method for operating a notification bar by an electronic device, the method comprising:

detecting an input moving an application icon, from an item area on a touch screen of the electronic device including at least one application icon, to a notification bar displayed on the touch screen; registering the moved application icon in the notification bar; displaying an item in the notification bar corresponding to the moved application icon; detecting a selection of the item in the notification bar; in response to the selection of the item in the notification bar, determining whether there is detailed information associated with the registered application icon; in response to determining that there is detailed information associated with the item, displaying a popup window displaying the detailed information without expanding the notification bar and without executing the application corresponding to the item; in response to determining that there is no detailed information associated with the item, performing a function corresponding to the item; display a memory icon in the notification bar when an external memory is mounted to the electronic device; in response to a tap event on the memory icon, display in the item area a file discovery window of the external memory; in response to detecting a hovering over a particular file in the file discovery window, output in a vicinity of the particular file a second popup window including a description of the file; and in response to a tap input selecting the particular file, display a second discovery window including a sub-directory of the selected particular file.

8. The method of claim 7, further comprising: removing the popup window displaying the detailed information when a predetermined time has elapsed after outputting the detailed information or based on an input of a signal for removing the popup window displaying the detailed information.

9. The method of claim 7, further comprising:

detecting an input moving the item corresponding to the application icon from the notification bar to the item area;

removing the application icon registered from the notification bar; and ceasing display of the item corresponding to the application icon in the notification bar.

10. The method of claim 7, wherein the detailed information comprises at least one menu for performing the function corresponding to the item.

11. The method of claim 7, wherein the selection of the item comprises at least one of a hovering of a touch input tool, a tap, a double-touch, a multi-touch, or a gesture.

12. A non-transitory computer-readable storage medium having a computer-readable program stored therein, wherein the computer-readable program, when executed on an electronic device, causes the electronic device to:

detect an input moving an application icon, from an item area on a touch screen of the electronic device including at least one application icon, to a notification bar displayed on the touch screen, register the moved application icon in the notification bar, display an item, in the notification bar, corresponding to the moved application icon, detect a selection of the item in the notification bar, in response to the selection of the item in the notification bar, determine whether there is detailed information associated with the registered application icon, in response to determining that there is detailed information associated with the item, control the touch screen to display a popup window displaying the detailed information without expanding the notification bar and without executing the application corresponding to the item, in response to determining that there is no detailed information associated with the item, perform a function corresponding to the item; display a memory icon in the notification bar when an external memory is mounted to the electronic device, in response to a tap event on the memory icon, display in the item area a file discovery window of the external memory, in response to detecting a hovering over a particular file in the file discovery window, output in a vicinity of the particular file a second popup window including a description of the particular file, and in response to a tap input selecting the particular file, display a second discovery window including a sub-directory of the selected particular file.

13. The method of claim 7, further comprising:

changing a size of the popup window based on an input of a signal for changing the size of the popup window.

* * * * *